(12) United States Patent
Itwaru

(10) Patent No.: US 10,223,674 B2
(45) Date of Patent: Mar. 5, 2019

(54) CUSTOMIZED TRANSACTION FLOW FOR MULTIPLE TRANSACTION TYPES USING ENCODED IMAGE REPRESENTATION OF TRANSACTION INFORMATION

(75) Inventor: Mark Itwaru, Toronto (CA)

(73) Assignee: Riavera Corp., Toronto (CA)

( * ) Notice: Subject to any disclaimer, the term of this patent is extended or adjusted under 35 U.S.C. 154(b) by 14 days.

(21) Appl. No.: 13/397,215

(22) Filed: Feb. 15, 2012

(65) Prior Publication Data

US 2013/0212004 A1    Aug. 15, 2013

Related U.S. Application Data

(63) Continuation-in-part of application No. 13/105,803, filed on May 11, 2011.
(Continued)

(51) Int. Cl.
*G06Q 40/00* (2012.01)
*G06Q 20/08* (2012.01)
(Continued)

(52) U.S. Cl.
CPC ....... *G06Q 20/0855* (2013.01); *G06Q 20/102* (2013.01); *G06Q 20/12* (2013.01);
(Continued)

(58) Field of Classification Search
CPC .......... G06Q 20/3276; G06Q 30/0643; H04M 15/00; G06F 3/0484; G06K 9/78
See application file for complete search history.

(56) References Cited

U.S. PATENT DOCUMENTS 5,729,594 A    3/1998    Klingman
5,778,173 A    7/1998    Apte
(Continued)

FOREIGN PATENT DOCUMENTS

CA         2769235 A1       2/2011
DE    102007059816 A1       6/2009
(Continued)

OTHER PUBLICATIONS

International Search Report and Written Opinion dated Aug. 27, 2012 issued from the Canadian Intellectual Property Office relating to PCT International Patent Application No. PCT/CA2012/000453.
(Continued)

*Primary Examiner* — Scott S Trotter
(74) *Attorney, Agent, or Firm* — Grant Tisdall

(57) ABSTRACT

The system includes receiving transaction information of the transaction including merchant identification information, consumer identification information and a transaction identifier associated with a barcode. The system also accesses a database of profile data using the merchant identification information to determine a transaction type of the transaction. The system also sends output data via the communications network by using workflow instructions associated with the transaction type, the output data for consumption by a consumer device of the consumer. The system also receives input data from the consumer device and includes the input data with the transaction information to generate a transaction request. The system can also send the transaction request via the communications network to a merchant interface of the merchant to complete the transaction with the merchant.

16 Claims, 10 Drawing Sheets

Related U.S. Application Data

(60) Provisional application No. 61/485,075, filed on May 11, 2011.

(51) Int. Cl.
| | |
|---|---|
| *G06Q 20/12* | (2012.01) |
| *G06Q 20/14* | (2012.01) |
| *G06Q 20/20* | (2012.01) |
| *G06Q 20/32* | (2012.01) |
| *G06Q 20/40* | (2012.01) |
| *G06Q 20/10* | (2012.01) |
| *G06Q 50/00* | (2012.01) |

(52) U.S. Cl.
CPC .............. *G06Q 20/14* (2013.01); *G06Q 20/20* (2013.01); *G06Q 20/32* (2013.01); *G06Q 20/3276* (2013.01); *G06Q 20/401* (2013.01); *G06Q 50/01* (2013.01)

(56) References Cited

U.S. PATENT DOCUMENTS

| | | | |
|---|---|---|---|
| 5,799,285 A | 8/1998 | Klingman | |
| 5,903,721 A | 5/1999 | Sixtus | |
| 5,923,735 A | 7/1999 | Swartz et al. | |
| 5,963,915 A | 10/1999 | Kirsch | |
| 5,970,475 A | 10/1999 | Barnes et al. | |
| 5,992,752 A | 11/1999 | Wilz, Sr. et al. | |
| 6,012,144 A | 1/2000 | Pickett | |
| 6,038,589 A | 3/2000 | Holdsworth | |
| 6,058,250 A | 5/2000 | Harwood et al. | |
| 6,078,902 A | 6/2000 | Schenkler | |
| 6,086,618 A | 7/2000 | Al-Hilali et al. | |
| 6,088,683 A | 7/2000 | Jalili | |
| 6,138,146 A | 10/2000 | Moon et al. | |
| 6,233,565 B1 | 5/2001 | Lewis et al. | |
| 6,332,134 B1 | 12/2001 | Foster | |
| 6,675,008 B1 | 1/2004 | Paik et al. | |
| 6,704,873 B1 | 3/2004 | Underwood | |
| 7,379,921 B1 | 5/2008 | Kiliccote | |
| 7,387,250 B2 | 6/2008 | Muni | |
| 7,581,257 B1 | 8/2009 | O'Hara | |
| 8,016,187 B2 | 9/2011 | Frantz et al. | |
| 8,275,699 B2 * | 9/2012 | Shader et al. | 705/38 |
| 2002/0046109 A1 * | 4/2002 | Leonard et al. | 705/14 |
| 2002/0062281 A1 | 5/2002 | Singhal | |
| 2002/0066039 A1 | 5/2002 | Dent | |
| 2002/0066042 A1 | 5/2002 | Matsumoto et al. | |
| 2002/0069165 A1 | 6/2002 | O'Neil | |
| 2002/0077976 A1 | 6/2002 | Meyer et al. | |
| 2002/0107745 A1 | 8/2002 | Loeser | |
| 2003/0155413 A1 * | 8/2003 | Kovesdi et al. | 235/375 |
| 2003/0195843 A1 | 10/2003 | Matsuda et al. | |
| 2005/0029358 A1 | 2/2005 | Mankins | |
| 2005/0125301 A1 | 6/2005 | Muni | |
| 2005/0197968 A1 | 9/2005 | Das et al. | |
| 2007/0119917 A1 | 5/2007 | Tomikawa et al. | |
| 2007/0194123 A1 | 8/2007 | Frantz et al. | |
| 2007/0244811 A1 | 10/2007 | Tumminaro | |
| 2007/0255620 A1 | 11/2007 | Tumminaro et al. | |
| 2008/0172314 A1 * | 7/2008 | Hahn-Carlson | 705/35 |
| 2008/0222048 A1 | 9/2008 | Higgins et al. | |
| 2008/0275760 A1 * | 11/2008 | Easterly et al. | 705/10 |
| 2008/0285755 A1 | 11/2008 | Camus et al. | |
| 2008/0313081 A1 | 12/2008 | Wee | |
| 2009/0090783 A1 | 4/2009 | Killian et al. | |
| 2009/0108080 A1 | 4/2009 | Meyer et al. | |
| 2009/0222353 A1 | 9/2009 | Guest et al. | |
| 2009/0240626 A1 | 9/2009 | Hasson et al. | |
| 2009/0254479 A1 | 10/2009 | Pharris | |
| 2009/0254485 A1 * | 10/2009 | Baentsch et al. | 705/71 |
| 2009/0266893 A1 | 10/2009 | Chen | |
| 2010/0138344 A1 | 6/2010 | Wong et al. | |
| 2010/0169223 A1 | 7/2010 | Yuan | |
| 2010/0211506 A1 | 8/2010 | Chang et al. | |
| 2011/0145093 A1 | 6/2011 | Paradise et al. | |
| 2011/0212707 A1 | 8/2011 | Mahalal | |
| 2011/0244920 A1 | 10/2011 | Coppinger | |
| 2011/0251892 A1 | 10/2011 | Laracey | |
| 2012/0030121 A1 | 2/2012 | Grellier | |
| 2012/0066081 A1 | 3/2012 | Shader et al. | |
| 2012/0078751 A1 | 3/2012 | Macphail et al. | |
| 2012/0130889 A1 | 5/2012 | Lyons et al. | |
| 2012/0136797 A1 | 5/2012 | Coppinger | |
| 2012/0233004 A1 * | 9/2012 | Bercaw | G06Q 20/20 705/17 |
| 2012/0290418 A1 | 11/2012 | Itwaru | |
| 2013/0181045 A1 * | 7/2013 | Dessert | G06Q 20/322 235/383 |

FOREIGN PATENT DOCUMENTS

| | | |
|---|---|---|
| EP | 0765068 A2 | 3/1997 |
| EP | 0813325 A2 | 12/1997 |
| EP | 0926611 A2 | 6/1999 |
| EP | 1921578 A1 | 5/2008 |
| EP | 2073160 A1 | 6/2009 |
| EP | 2088549 A1 | 8/2009 |
| WO | 9637848 A1 | 11/1996 |
| WO | 0195591 A1 | 12/2001 |
| WO | 02102133 A2 | 12/2002 |
| WO | 2011112752 A1 | 9/2011 |
| WO | 2011127354 A2 | 10/2011 |
| WO | 2011130422 A2 | 10/2011 |
| WO | 2012101019 A1 | 8/2012 |
| WO | 2012151660 A1 | 11/2012 |
| WO | 2012158506 A1 | 11/2012 |

OTHER PUBLICATIONS

Gao, et al., "A 2D Barcode-Based Mobile Payment System", 2009 Third International Conference on Multimedia and Ubiquitous Engineering, pp. 320-329, Jun. 4-6, 2009.
International Search Report and Written Opinion dated May 24, 2012 issued from the Canadian Intellectual Property Office relating to PCT International Patent Application No. PCT/CA2012/000223.
International Search Report and Written Opinion dated Jul. 30, 2012 issued from the Canadian Intellectual Property Office relating to PCT International Patent Application No. PCT/CA2012/000452.
Ion, et al., "Don't trust POS terminals! Verify in-shop payments with your phone", presented at Pervasive 2008 Sixth International Conference on Persuasive Computing, Sydney Australia, http://www.persuasive2008.org/.
International Search Report and Written Opinion dated Apr. 15, 2013 issued from the Canadian Intellectual Property Office relating to PCT International Patent Application No. PCT/CA2013/000135.
International Search Report and Written Opinion dated Apr. 29, 2013 issued from the Canadian Intellectual Property Office relating to PCT International Patent Application No. PCT/CA2013/000136.
Anonymous: "QR Code Essentials," Dec. 31, 2001, pp. 1-12, retrieved from the Internet URL: http://www.nacs.org/LinkClick.aspx?fileticket=D1FpVAvvJuo=&tabid=1426&mid=4802, retrieved on Feb. 11, 2014.
Extended European Search Report dated Jun. 25, 2015, in European Patent Application No. 13749637.8, filed Feb. 15, 2013.

* cited by examiner

CUSTOMIZED TRANSACTION FLOW FOR MULTIPLE TRANSACTION TYPES USING ENCODED IMAGE REPRESENTATION OF TRANSACTION INFORMATION

This application claims priority to U.S. Provisional Patent Application Ser. No. 61/485,075 filed May 11, 2011 and is a Continuation-In-Part to U.S. patent application Ser. No. 13/105,803, filed May 11, 2011, all of which are hereby incorporated by reference in their entirety.

FIELD

The present invention is related to merchant product ordering systems using optical machine readable images such as barcodes to expedite transaction processing.

BACKGROUND

Barcodes and other optical machine readable images are used extensively to represent information about an object. Decoding or reading a barcode is accomplished by translating the patterns of the barcode, such as bars and spaces in linear barcodes or blocks or other features in a 2D barcode, into the corresponding numbers or characters. Barcodes are widely used for encoding information and tracking purposes in retail, shipping and industrial settings. Barcodes and their uses are becoming more mainstream, however their uses remain mostly in providing static information about a particular product or service, or in recent years providing a static link to a website in relation to the product or service associated with the barcode.

For years, the merchant ordering and payment systems, and banking and payment processing in general, have been trying to engineer a transaction processing technology that is secure, efficient and easy to use, thereby facilitating the customers shopping and payment experience, both at point of sale (POS) terminals and for online shopping. In particular, providing the customer with some control in how their personal financial information is provided to the merchant has so far been elusive. This inability to involve more customer control of the transaction while at the same time streamlining the amount of time and information a customer must spend and provide during the product ordering and purchasing process has effectively relegated customer experience in product purchasing to that of yesterday rather than the future. In particular, the leveraging of current and future mobile technology capabilities to the product transaction market to predominantly the purchase of downloadable items such as ringtones and music. Barcodes have been used in an effort to speed up the customer experience by providing merchant terminals information about the product when scanned through a checkout scanner, i.e. the price and brief description of the product that the barcode is attached/applied to. However, any use of the barcode during the customer shopping experience, other than as a look up service for a price of a product on a product by product basis, is simply not available.

Further, the ability to distinguish and customize different transaction processing for different transaction types is cumbersome at best, using current statically configured transaction processing systems. The ability of current state of the art transaction processing systems, be them point of sale terminals or backend transaction processing systems, to provide for customized transaction workflow and data requirements on a transaction by transaction basis is not available, in particular for the mobile payment space.

At the same time, developments in the field of mobile commerce are being facilitated by improved functionality and features available on mobile devices, and by such functionality and features becoming more commonplace on current mobile devices. For example, cell phones, smart phones and tablet computers nowadays are commonly integrated, multi-functional devices. In addition to their core, basic functionality, they will often have, or can be configured to have, web-enabled functionality, various other communication capabilities (e.g., e-mail, text, wi-fi, etc.), camera functions, scanning and graphical image handling functionalities and other capabilities. Graphical interfaces of desktop computers, including image processing capabilities, have also become more advanced in their functionality and provided features. However, to date the customer shopping experience during checkout (either in person or online) has not benefited from these advanced functionality and provided features of desktop GUIs and mobile devices.

SUMMARY

Presently there is a need to provide a system and method to integrate the use of optical machine readable images in bettering the consumer ordering experience involving transactions that addresses at least one of the identified problems in the current state of the art.

Currently, the ability to distinguish and customize different transaction processing for different transaction types is cumbersome at best, using current statically configured transaction processing systems. The ability of current state of the art transaction processing systems, be them point of sale terminals or backend transaction processing systems, to provide for customized transaction workflow and data requirements on a transaction by transaction basis is not available, in particular for the mobile payment space. Contrary to current systems there is provided a transaction system for coordinating processing of a transaction between a consumer and a merchant, the transaction associated with the merchant providing a product to the consumer. The system includes receiving transaction information of the transaction including merchant identification information, consumer identification information and a transaction identifier associated with a barcode. The system also accesses a database of profile data using the merchant identification information to determine a transaction type of the transaction. The system also sends output data via the communications network by using workflow instructions associated with the transaction type, the output data for consumption by a consumer device of the consumer. The system also receives input data from the consumer device and includes the input data with the transaction information to generate a transaction request. The system can also send the transaction request via the communications network to a merchant interface of the merchant to complete the transaction with the merchant.

A first aspect provided is a transaction system for coordinating processing of a transaction between a consumer and a merchant, the transaction associated with the merchant providing a product to the consumer, the system comprising: a computer processor coupled to a memory, wherein the computer processor is programmed to coordinate processing of the transaction by: receiving transaction information of the transaction including merchant identification information, consumer identification information and a transaction identifier associated with a barcode; accessing a database of profile data using the merchant identification information to determine a transaction type of the transaction; sending output data via the communications network by using workflow instructions associated with the transaction type, the output data for consumption by a consumer device of the consumer; receiving input data from the consumer device and including the input data with the transaction information to generate a transaction request; and sending the transaction request via the communications network to a merchant interface of the merchant to complete the transaction with the merchant.

A second aspect provided is a method for coordinating processing of a transaction between a consumer and a merchant, the transaction associated with the merchant providing a product to the consumer, the method comprising: receiving transaction information of the transaction including merchant identification information, consumer identification information and a transaction identifier associated with a barcode; accessing, using a computer processor, a database of profile data using the merchant identification information to determine a transaction type of the transaction; sending, using the computer processor, output data via the communications network by using workflow instructions associated with the transaction type, the output data for consumption by a consumer device of the consumer; receiving input data from the consumer device and including the input data with the transaction information to generate a transaction request; and sending the transaction request via the communications network to a merchant interface of the merchant to complete the transaction with the merchant.

A third aspect provided is a non-transitory computer readable storage medium with an executable transaction application stored thereon, the transaction application configured for generating a transaction request for receipt by a transaction interface over a communications network, a transaction of the transaction request associated with a merchant providing a product to a consumer, wherein the transaction application instructs a computer processor to perform the following steps of: receiving a barcode including symbology information having encoded transaction information of the transaction, the transaction information including merchant identification information and a transaction identifier associated with the barcode; sending the transaction request including the transaction information to the transaction interface, the barcode associated with a transaction type of a plurality of transaction types; receiving output data from the transaction interface based on workflow instructions associated with the transaction type, the output data for consumption by the transaction application; sending input data to the transaction interface based on the output data, the input data for including with the transaction information already received by the transaction interface; and receiving a transaction response including confirmation information of processing of the transaction.

A fourth aspect provided is a method for generating a transaction request for receipt by a transaction interface over a communications network, a transaction of the transaction request associated with a merchant providing a product to a consumer, the method including: receiving a barcode including symbology information having encoded transaction information of the transaction, the transaction information including merchant identification information and a transaction identifier associated with the barcode; sending the transaction request including the transaction information to the transaction interface, the barcode associated with a transaction type of a plurality of transaction types; receiving output data from the transaction interface based on workflow instructions associated with the transaction type, the output data for consumption by the transaction application; sending input data to the transaction interface based on the output data, the input data for including with the transaction information already received by the transaction interface; and receiving a transaction response including confirmation information of processing of the transaction.

BRIEF DESCRIPTION OF THE DRAWINGS

Exemplary embodiments of the invention will now be described in conjunction with the following drawings, by way of example only, in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device.

For example, and without limitation, the programmable computer can be a mobile computing device having a processor for processing barcode images and program code, a server computer having a processor for generating encoded optical machine readable images (e.g. barcode images) based on transaction (e.g. invoice) information and processing program code, an image sensor for capturing images, and at least one network interface for communicating transaction (e.g. payment) information and/or generated images. Program code may be executed by the processor to operate on input data, such as the captured image, to perform the functions described herein and generate output data representative of transaction data. Further, program code may be executed by the processor to operate on input data, provided by merchant product order systems related to one or more products, to perform the functions described herein and generate output data as an image representing encoded product and merchant data. Further, program code may be executed by the processor to operate on input data provided by a consumer in response to transaction instructions, such as the transaction data, to perform the functions described herein and generate output data as a response to the transaction instructions for use in subsequent processing of the transaction related to information obtained from an image.

Overview of Customized Payment Transaction Environment 10

Figure 1:
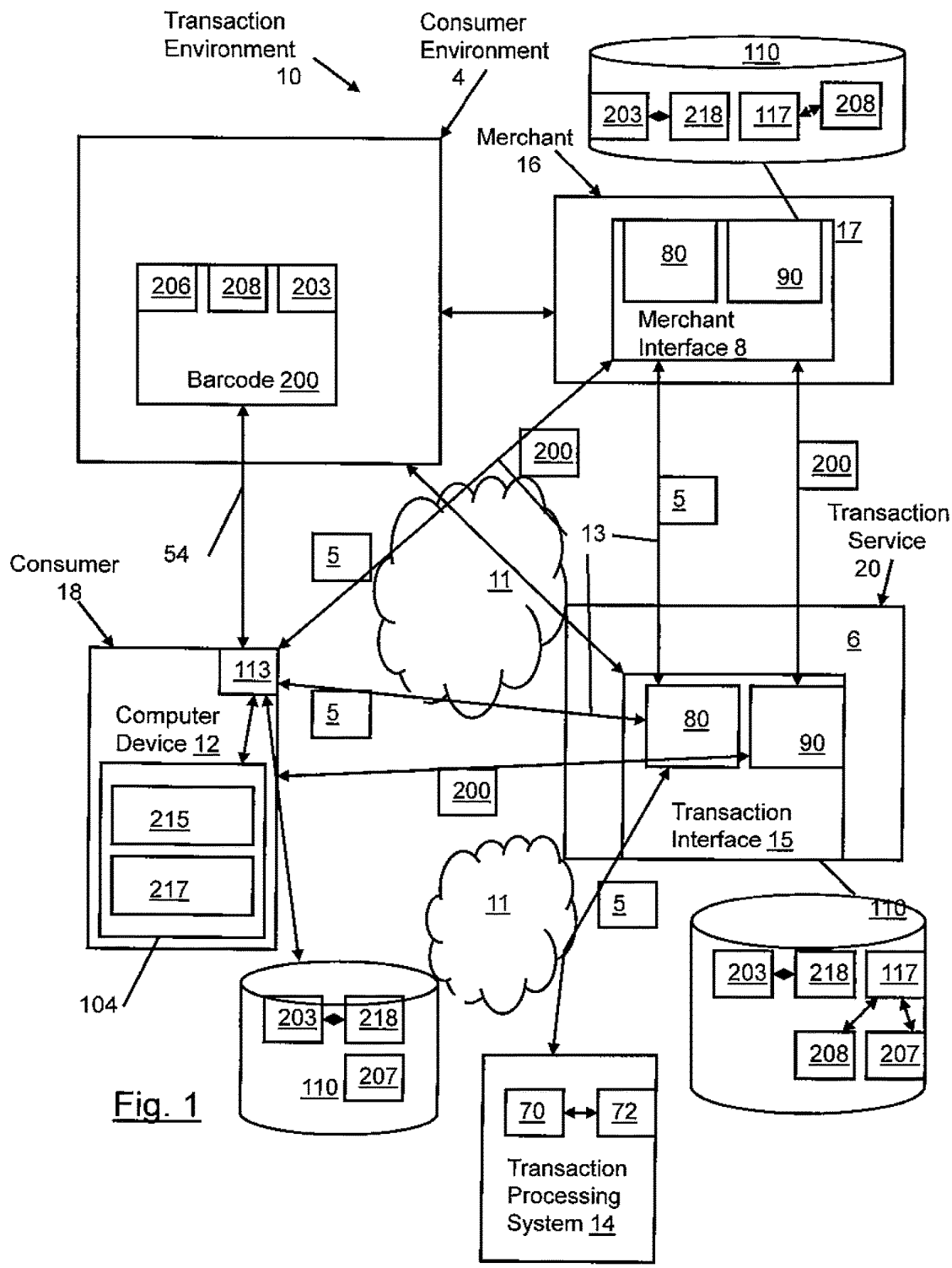
FIG. 1 is a block diagram of components of a transaction processing system using customized workflow.

Referring to FIG. 1, shown is a customized transaction (e.g. for payments) environment 10 that includes a consumer environment 4 from which a consumer 18 encounters an optical machine readable image (OMRI) 200 and interacts with the OMRI 200 using their computer device 12 (e.g. desktop computer, mobile device, etc.) via a transaction application 113. The transaction environment 10 also has a merchant 16 operating their computer device 17 (e.g. a merchant computer system including one or more servers, one or more desktop computers, one or more point of sale (POS) terminals, and/or one or more mobile devices), who requests generation of the OMRI 200 (see FIG. 3) to include product data 206, merchant data 208 and/or transaction type data 203 (further described below) from a transaction service 20. The merchant 16 can make the OMRI 200 available in the consumer environment 4 for subsequent access by the consumer 18 and/or can send the OMRI 200 directly to the computer device 12 of the consumer 18 via a communications network 11. The merchant 16 can also instruct the transaction service 20 to send the OMRI 200 directly to the computer device 12 of the consumer 18 via the communications network 11.

The communications network 11 can be a one or more networks, for example such as but not limited to: the Internet; an extranet; and/or an intranet. Further, the communications network 11 can be a wired or wireless network. It is also recognized that network 11 messages (between the various devices 6, 12, 17 and system 14) can be communicated via short range wireless communication protocols such as but not limited to Bluetooth™, infrared (IR), radio frequency (RF), near field communication (NFC) and/or by long range communication protocols (e.g. HTTP, HTTPS, etc.), in view of the type of electronic communication required between any pair of devices 6, 12, 17 and system 14. For example, devices 12,17 could communicate with one another using short range Bluetooth™ communications while devices 6,12 or 6,17 could communicate with one another using long range HTTP or HTTPS based communications.

Further, the transaction service 20 can communicate also via the communications network 11 with a transaction processing system 14 that performs the settlement (e.g. debit of funds specified in the transaction 5 from a financial account of the consumer 18 and crediting of the funds in to a financial account of the merchant 16) of any required funds transfer in the transaction 5 between the financial accounts 70, 72 (e.g. the merchant account 72 and the consumer account 70). It is recognized that the actual amount of debit and credit funds actions performed by the transaction processing system 14 may not exactly match a funds amount specified in the transaction 5, as embodied in the OMRI 200, due to applied service charges. For example, a payment request of $5 from the financial account 72 to the financial account 70 could result in an actual debited amount of $5.02 (representing an included $0.02 service charge to the consumer 18) and/or an actual credited amount of $4.98 (representing an included $0.02 service charge to the merchant 16). Therefore, it is anticipated that processing of the electronic funds transfer (optional) of the transaction 5 can involve a transaction service charge being charged to the merchant 16 and/or the consumer 18 in order to complete the funds transfer of the transaction 5 that was initiated through accessing by the consumer 18 of the OMRI 200 from the environment 4 and/or initiated by generating of the OMRI 200 and sending of the OMRI 200 (either by the merchant 16 or by the transaction service 20) to the computer device 12 of the consumer 18.

Transaction 5 settlement can be defined as where the funds amount (i.e. optional financial component of the transaction 5) is transferred (via the transaction processing system 14) from the one account 70 to the other account 72, i.e. the credit and debit transactions of the funds amount against the respective accounts 70,72 are either performed (e.g. in real time) or promised to be performed (e.g. included in a batch transaction to be performed later in the day or following business day).

It is recognized that network 11 communication messages facilitating the processing of the transaction 5 are preferably between each of the transaction application 113 and the merchant interface 8 and the transaction interface 15 directly, rather than directly between the transaction application 113 and the merchant interface 8 themselves (i.e. directly meaning without interaction with the transaction interface 15). Therefore, in one embodiment, in the event that the transaction application 113 and the merchant interface 8 need (e.g. request) information from one another, these request (and response) network 11 messages would go through the transaction interface 15 acting as an intermediary network interface between the transaction application 113 and the merchant interface 8. However, it is recognized that network 11 messaging directly between the transaction application 113 and the merchant interface 8 can also be configured, for example for the purpose of gathering information relevant to generation and/or processing of the transaction 5 as desired.

The transaction service 20 has the transaction interface 15 including an transaction processing system 80 and an OMRI processing (e.g. generation and/or decoding) system 90 (further described below), such that the system 90 generates or otherwise decodes the OMRI 200 for the merchant 16 (or directly for the consumer 18) and the system 80 interacts with the merchant 16 and the consumer 18 to process the transaction 5 there-between upon receipt of the OMRI 200 (and/or information obtained from the OMRI 200 from a transaction application 113 provisioned on the computer device 12) from the consumer 18.

Therefore, the transaction service 20 is implemented on the computer device 6 (e.g. a web server) and communicates over the communications network 11 with the computer devices 17,12 via a hosted transaction interface 15. The transaction interface 15 of the transaction service 20 can be a web site accessible over the communications network 11 by the computer devices 17,12 using respective web browsers operating on the computer devices 17,12, such that the transaction interface 15 is in communication with the transaction application 113 and the merchant interface 8. Accordingly, the transaction interface 15, computer device 12 and computer device 17 can interact (e.g. via network 11 messages) together to initiate and complete the transaction 5, for example based on products offered and sold by the merchant 16 to the customer 18, such that the OMRI 200 (see FIG. 3) is generated and included as part of the initiation and/or processing of the transaction 5 in conjunction with the order interface 15.

Consumer Environment 4

Referring to FIG. 1, the consumer environment 4 is defined as the environment in which the consumer 18 can come into contact with the OMRI 200. It is recognized that the OMRI 200 can be obtained by the computer device 12 through an electronic network message 54 (e.g. sent directly or indirectly from the merchant 16 via the environment 4) containing an image of the OMRI 200 and/or can be obtained using an imager 118 (e.g. a camera—see FIG. 5) operated through the computer device 12 in order to capture an image of the OMRI 200 in range of the imager 118. In terms of electronic messages 54 containing an image of the OMRI 200, these can be messages such as but not limited to: email messages; browser based messages obtained via interaction with a website (e.g. merchant website, affiliated merchant website, product advertizing website, etc.); and/or other network 11 communication messages. In terms of a media displayed image of the OMRI 200, the media used can be printed media such as but not limited to: magazines; newspapers; clothing; billboards; barcode labels; etc. In other words, printed media used as a source of the OMRI 200 can be any physical substrate (e.g. paper, cloth, plastic, etc.) upon which the OMRI 200 is printed, formed, or otherwise embossed. In terms of electronic media used to display the image of the OMRI 200, the electronic media can be such as but not limited to: electronic billboards; computer displays of the merchant computer systems such as point of sale terminals; displays of the consumer 18 such as desktop computers; television screens; and any other computer display adjacent to and in range of the imager 118 of the computer device 12.

One example of the consumer environment 4 is where the computer device 12 receives a network message 54 containing an image of the OMRI 200 that is displayed on the user interface 104 (see FIG. 5) of the computer device 12. In this example, the network message 54 can be an order screen sent from a merchant order interface 8 (of a merchant website) operated by the merchant computer device 17. The consumer 18 can select the OMRI 200 image on their user interface 104 using a cursor or touch screen functionality of the computer device 12 and then use the transaction application 113 to coordinate subsequent transaction 5 processing via the processing system 80 of the transaction service 20 and/or via merchant interface 8 of the merchant device 17.

A further example is where the consumer 18 is at a POS terminal (e.g. computer device 17) of the merchant 16, for example during purchase of retail products. The consumer 18 would use the imager 118 of the computer device 12 to capture an image of the OMRI 200, which could be displayed in printed form (e.g. on a paper order form) and/or on a computer display (e.g. of the POS). The consumer 18 could then use the transaction application 113 to coordinate subsequent transaction 5 processing via the processing system 80 of the transaction service 20 and/or via merchant interface 8 of the merchant device 17.

Therefore, as discussed below, the computer device 12 does not necessarily have to communicate electronically with the transaction interface 15 or the merchant interface 8 in order to receive the OMRI 200, Instead, the OMRI 200 can be presented to the consumer 18 on a merchant display screen and/or on printed label at a merchant physical retail location. In this manner, the consumer 18 can record an image of the OMRI 200 by using the imager 118 of the computer device 12 (e.g. a camera enabled mobile device), for subsequent processing by the computer device 12 and the transaction service 20.

Definition of Products

In economics, economic output is divided into goods and services. When an economic activity yields a valuable or useful thing, it can be known as production output of the totality of products (e.g. goods or services) in an economy that the merchant 16 makes available for use by the consumers 18. Products as goods can range from a simple safety pin, food, clothing, computer components to complex machinery and electronic or physical media (physical or electronic versions of music, print media, etc.). Products as services are the performance of any duties or work for another (e.g. helpful or professional activity) and can be used to define intangible specialized economic activities such as but not limited to: providing access to specific information; web services; transport; banking; legal advice; accounting advice; management consultant advice; and medical services. The merchant 16 providing the products can be a businessperson or individual engaged in wholesale/retail trade, an organization, an administration, and/or a business that sells, administers, maintains, charges for or otherwise makes available product(s) that are desirable by the consumers 18. Therefore, it is recognized that the products may be made available to the consumer 18 for purchase and/or for free. One example of a "free" product is a trial subscription to a web service.

Accordingly, the merchant 16 can be one person, or an association of persons, for the purpose of carrying on some enterprise or business; a corporation; a firm; etc. Further, it is recognised that the products can be related to company activities not related to specific product(s), for example customer service, community activities, donations, and/or sponsorships. These general activities of the merchant 16 are also considered as part of the definition of merchant 16 products.

As further discussed, the merchant products are offered (e.g. for sale) using the OMRI 200 (e.g. accessed via an online interface and/or image captured) that is made accessible by the consumer 18. for example, The merchant interface 8 provides the consumer 18 with the ability to select and/or specify a plurality of desired products for purchase (or without purchase and just as a registration or subscription not requiring payment as part of the transaction 5) and also provides the OMRI 200 (see FIG. 3) that contains encoded product information and merchant information (symbology information 204) representing summary information (e.g. product listing, total purchase price, merchant profile information, etc.) of the products, e.g. one barcode representing product and merchant data for two or more products. In any event, it is recognized that the OMRI 200 is received by the transaction application 113 of the computer device 12 to contain data (e.g. product data 206, merchant data 208, and/or transaction data 210) pertaining to one or more products, optionally including payment transaction data needed by the transaction processing system 14 to settle financial elements of the transaction 5 (optionally involving financial details).

The OMRI 200 (i.e. an optical machine-readable representation of data) of the funds transfer transaction 5 contains symbology information 204 in encoded form based on a coding scheme 209. One example of the OMRI 200 is a barcode, such that the coding scheme 209 is a barcode coding scheme for use in encoding and decoding of the symbology information 204 of the barcode. Another example of the OMRI 200 is a dataglyph, such that the coding scheme 209 is a dataglyph coding scheme for use in encoding and decoding of the symbology information 204 of the dataglyph.

It is recognized that the merchant 16 products can include restaurant meals (and/or service), such that the OMRI 200 represents a meal bill and the products are individual food and/or beverage items. It is also recognized that the merchant 16 products can be groceries or other retail items being paid for in person by the consumer 18 at the merchant retail establishment, for example. It is also recognized that the products in a rental or professional services context including a duration of the time the services were performed.

OMRI 200

Referring again to FIG. 3, as used herein, the term OMRI 200 (e.g. barcode, dataglyph, etc.) refers to an optical machine-readable representation of encoded information or data, presented as an ordered pattern of symbols (i.e. symbology information 204). For example, barcodes can encode information in the widths and the spacing of parallel lines, and may be referred to as linear or 1D (1 dimensional) symbologies. Barcodes can also encode information in patterns of squares, dots, hexagons and other geometric shapes or symbols within images termed 2D (2 dimensional) matrix codes or symbologies. Typically, although 2D systems use symbols other than bars, they are generally referred to as barcodes as well. Accordingly, barcode images discussed herein for use with a barcode scanner or decoder can refer to either 1D or 2D barcodes. With conventional monochromatic barcodes, features are typically printed in black on a white background, thereby forming a pattern that is used to form the machine-readable representation of invoice information of the order invoice 202. With color barcodes, the pattern can include any number of colors (typically also including black and white) distinguishable from one another during the barcode decoding process.

The OMRI 200 is generated to include symbology information 204 representing merchant and product content used, for example, to help define product and payment or other transaction terms/details concerning the product(s) made available to the consumer 18 by the merchant 16. As discussed further below, the OMRI 200 can be electronically displayed (e.g. on a computer display), can be provided as graphic content (e.g. an image file such as but not limited to a GIF or JPEG) in a network message 54) and/or can be provided in printed form (e.g. presented on a physical medium such as paper or plastic—for example associated with a picture in a magazine or present on a label). As discussed, interaction between the OMRI 200 and the consumer 18 placing the order for the product(s) can include consumer 18 actions such as but not limited to: selection (e.g. via mouse or other pointer) on the user interface 104 of the customer device 12 displaying the OMRI 200; receiving the image file containing the OMRI 200; and/or recording/capturing the image of the OMRI 200 using the imager 118 (e.g. camera) (see FIG. 5) of the computer device 12 (e.g. mobile device), such that the OMRI 200 is displayed on physical media and/or electronic media (i.e. an electronic display adjacent to the customer device 12 and in-range of the imager 118). Example environments of the described image capture process would be where the OMRI 200 is displayed on a desktop computer of the consumer 18 or on a computer terminal (part of the transaction interface 8) of the merchant 16.

In terms of the symbology information 204 of the OMRI 200, the symbology information 204 includes a plurality of symbols (i.e. graphical elements) that, as a collection of symbols or patterns (e.g. an organized collection of symbols forms a legend, or key), represents encoded transaction information that is distinct from the actual unencoded merchant and product information 201 itself. For example, a graphical element (of the symbology 204) of a black line of a specific width represents a textual element (of the textual information 201) as the number six, while a different width represents a different textual element (of the textual information 201) such as the number two. It is recognized that graphical elements can be pictures (e.g. images) of text elements and/or of non-text elements. For example, the graphical element "6" (e.g. encoded or symbology information 204) in the coding scheme 209 could be mapped to a product code "1234" (e.g. unencoded information 201). In another example, the graphical element "(*)" (e.g. encoded or symbology information 204) in the coding scheme 209 could be mapped to a product code "1234" (e.g. unencoded information 201).

The purpose of the symbology information 204 is to communicate encoded invoice information (that defines a plurality of invoice parameters) as readable (e.g. decodable) by an image decoder. The decoder could be present on the customer device 12 and/or on the transaction service 20, as further described below. It is recognized that mapping (i.e. processing performed by the decoder or encoder) between the symbology information 204 and the unencoded merchant and product information 201 is what enables the OMRI 200 to be generated and interpreted. A specification of the symbology information 204 can include the encoding of the single digits/characters of the textual merchant and product information 201 as well as the start and stop markers into individual symbols (e.g. bars) and space between the symbols of the symbol collection/pattern, the size of a quiet zone required to be before and after the OMRI 200, as well as a computation of a checksum incorporated into the OMRI 200 for error checking purposes as is known in the art.

It is recognized that the OMRI 200 may not contain descriptive data, rather the OMRI 200 can be used as containing reference codes (e.g. decoded barcode information) that a computer uses to look up an associated record that contains the descriptive textual merchant and product information 201, as well as any other relevant information about the products or items associated with the transaction 5 encoded in the OMRI 200. For example, the matching item record of the symbology information 204 can contain a description of the product, vendor name, product price, quantity-on-hand, etc., including any of the product data 206, merchant data 208, customer data 211, transaction type data 203 and/or transaction data 210 as further described below. However, some barcodes 200 can contain, besides reference ID, additional or supplemental information such as product name or manufacturer, for example, and some 2D OMRI 200 may contain even more information as they can be more informationally dense due the greater variation potential of the printed patterns over those of 1D OMRI 200.

In terms of different barcode type, linear symbologies (e.g. UPC barcodes as an example symbology format of the aggregated barcode 200) can be classified mainly by two properties, continuous vs. discrete and two-width vs. many-width. In continuous vs. discrete, characters (i.e. representing the merchant and product information 201 content) in continuous symbologies usually abut, with one character ending with a space and the next beginning with a bar (e.g. light-dark patterns), or vice versa. Characters (i.e. representing textual merchant and product information 201 content) in discrete symbologies begin and end with bars and any intercharacter space is ignored as long as it is not wide enough to look like the code ends. In two-width vs. many-width, bars and spaces in two-width symbologies are wide or narrow, and the exact width of a wide bar has no significance as long as the symbology requirements for wide bars are adhered to (usually two to three times wider than a narrow bar). Bars and spaces in many-width symbologies are all multiples of a basic width called the module, wherein most such codes use four widths of 1, 2, 3 and 4 modules. Some linear symbologies use interleaving, such that the first character (i.e. representing the textual merchant and product information 201 content) is encoded using black bars of varying width. The second character (i.e. representing the invoice data content) is then encoded, by varying the width of the white spaces between these bars. Thus characters (i.e. representing the invoice data content) are encoded in pairs over the same section of the barcode. Stacked symbologies repeat a given linear symbology vertically.

In terms of multidimensional symbologies (e.g. 2D, 3D, etc.), the most common among the many 2D symbologies are matrix codes, which feature square or dot-shaped modules (i.e. representing the merchant and product information 201 content) arranged on a grid pattern. 2-D symbologies also come in circular and other patterns and may employ steganography, thereby hiding modules within an image (for example, using DataGlyphs). Aztec Code is another type of 2D barcode.

Quick Response Codes (QRC) is another a type of matrix barcode (or two-dimensional code) providing faster readability and larger storage capacity compared to traditional UPC barcodes. The QR code (as an example symbology format of the barcode 200) consists of black modules arranged in a square pattern on a white background. The information encoded can be made up of four standardized kinds ("modes") of encoded data (e.g. numeric, alphanumeric, byte/binary, and/or Kanji), or by supported extensions virtually any kind of data.

It is also recognized that the symbology information 204 of the OMRI 200 can include custom graphical elements (as codified in the coding scheme 209) involving combinations of one or more graphical elements used to represent a textual element, e.g. a corporate logo is used as a collection of graphical elements (e.g. circle, square, and company name) that is mapped (e.g. decoded) by the coding scheme 209 to represent a textual element (e.g. a URL to a webpage of the company website). Alternatively, the textual element can be mapped (e.g. encoded) by the coding scheme 209 to represent the collection of graphical elements. In this example, the graphical element of a company name (the symbology information 204) is decoded by the coding scheme 209 to represent the text of the URL (the unencoded information 201). One example of barcodes containing custom graphical elements is Microsoft™ Tag barcodes.

Microsoft™ Tags as an OMRI 200 are another type of barcode, e.g. 2D barcodes, which offer more flexibility than traditional barcode formats both in the barcode design and the content behind it. Because Microsoft Tag barcodes can be linked to data stored on a server, you can deliver a more robust online experience—including entire mobile sites—and update the content any time without having to change the Microsoft Tag. So, if you link a Microsoft Tag on your business card to your résumé, it will still be valid after you get that big promotion. Microsoft Tags can be black-and-white or full-color, including custom images (e.g., a company logo). Therefore, the Microsoft Tag can have encoded data in the symbology information 204 of the Tag that includes a link (e.g. URL) or other hyperlink that references a location in memory (e.g. in a database) and/or a network address where data content is available/accessible via the encoded link. In other words, a Tag encoder would use a Tag coding scheme 209 to encode the textual link information 201 into corresponding symbology information 204, e.g. the hyperlink to a website (the textual link information 201) would be represented as one or more graphical elements such as a company logo or even graphical elements (the symbology information 204) picturing the product itself.

It is also recognized that the symbology information 204 of the OMRI 200 can be encrypted (e.g. using a DES algorithm). In terms of the format of the symbology information 204, codewords embedded/encoded in the symbology information 204 are typically 8 bits long. It is recognized that the transaction 5 data represented by the symbology information 204 in the OMRI 200 can be broken up into multiple blocks, such that each block includes a number (e.g. 255) of codewords in length.

Another example of an optical machine-readable (e.g. OMRI 200) representation of encoded information or data are DataGlyphs, which are a new technology for encoding machine readable data onto paper documents or other physical media. They encode information into a number of tiny, individual glyph elements. Each graphical (e.g. glyph) element can consist of a small 45 degree diagonal line as short as $\frac{1}{100}$th of an inch or less, depending on the resolution of the printing and scanning that is used, for example. Each glyph element (as the symbology information 204) represents a single binary 0 or 1 (as the decoded textual information 201), depending on whether it slopes to the left or right. Sequences of these glyph elements (symbology information 204) can be used to encode numeric, textual or other information (unencoded information 201).

As an example configuration of the dataglyph symbology and coding scheme 209, the individual glyphs are grouped together on the page (or displayed electronically on a display), where they form unobtrusive, evenly textured gray areas, like half-toned pictures. One of the reasons for using diagonal glyph elements is because research has shown that the patterns that they form when massed together are not visually distracting. DataGlyph technology allows ordinary business documents to carry thousands of characters of information hidden in these unobtrusive gray patterns that can appear as backgrounds, shading patterns or conventional graphic design elements. Often, their presence will go completely unnoticed. (The entire Gettysburg Address will fit in a DataGlyph about the size of a small US postage stamp). DataGlyph areas can be printed on a document as part of its normal printing process or displayed on a screen as part of the normal image rendering process. The information to be put in the DataGlyphs is encoded as a sequence of individual glyphs, and these can be printed either directly by the encoding software (for instance, by computer laser printer) or via a conventional printing process, such as offset. The glyphs are laid down on a finely spaced rectangular grid so that the area is evenly textured. In addition, each glyph area contains an embedded synchronization lattice or "skeleton"—a repeating, fixed pattern of glyphs which marks the boundaries of the glyph area and serves as a clocking track to improve the reliability of reading. Before data is placed into the synchronization frame, it's grouped into blocks of a few dozen bytes and error correcting code is added to each block. The amount of error correction to be used is chosen by the application, depending on the expected quality of the print-scan cycle. Higher levels of error correction increase the size of the glyph area needed for a given amount of data, but improve the reliability with which the data can be read back. This can be very important in environments where there's a high level of image noise (for example, fax) or where the documents are subjected to rough handling. As a final step, the bytes of data are randomly dispersed across the glyph area, so that if any part of the glyph area on the paper is severely damaged, the damage to any individual block of data will be slight, and thus easy for the error correcting code to recover. Together, error correction and randomization provide very high levels of reliability, even when the glyph area is impaired by ink marks, staples and other kinds of image damage.

In view of the above description, it is recognized that OMRI 200 can be embodied as barcodes, dataglyphs or other images that contain encoded symbology information 204 that can be decoded into unencoded information 201 (e.g. textual elements) using an appropriate coding scheme 209 that provides a mapping (e.g. rules) between the symbology information 204 to into the unencoded information 201 (e.g. the decoding process) and the unencoded information 201 into the symbology information 204 (e.g. the encoding process). In any event, the following description, for simplified example explanation purposes only, refers to OMRI 200 as barcodes 200. However, it is recognized that in the below description, the term barcode 200 can be interchanged with the broader meaning of OMRI 200, as desired.

In view of the above, it is recognized that there can be a variety of different OMRI 200 encoded for different transaction types 203. For example, the transaction type 203 assigned to the OMRI 200 will determine what portion of the functionality of the transaction application 113 is used by the consumer 18, and/or provided by the transaction interface 15 or merchant interface 8, to facilitate processing of the transaction 5 associated with the OMRI 200.

Transaction Application 113

Referring to FIG. 1, it is recognized that the transaction application 113 can include a plurality of barcode 200 related processing functionality, a plurality of transaction processing functionality and/or client functionality configured for network 11 communication with a transaction service 20 in a client-server relationship. For example, the transaction application 113 can be configured as a thin client of the transaction service 20, such that the transaction application 113 is configured to interact with the barcode processing system 80 (of the interface 8,15) via a series of web pages generated by the barcode processing system 80, sent via network messages 13 and displayed on the user interface 104. Accordingly, the transaction application 113 would interact with a web browser (or other network communication program) to send and receive the messages 13 via the network 11 containing transaction 5 specific information, i.e. to display the web pages including output data 217 (further discussed below) for the transaction 5 and to coordinate the entry and network transmission of input data 215 (further discussed below) for the transaction 5.

Alternatively, the transaction application 113 can be configured as a thick client of the transaction service 20, such that the transaction application 113 is provisioned with transaction and/or barcode processing functionality similar to (or at least contains a portion of) that functionality of the transaction processing system 80 and/or the barcode processing system 90, as further described below. It is recognized that the thick client version of the transaction application 113 could be configured to perform some of the transaction or barcode processing on behalf of or otherwise in substitution of any of the processing functionality of the transaction processing system 80 and/or the barcode processing system 90 implemented by the overall system 10 during processing of the transaction 5. It is also recognized that the thick client version of the transaction application 113 could also be configured to communicate over the network 11 via a series of web pages as generated or otherwise received by the transaction processing system 80 of the interfaces 8,15, sent via as network messages 13 between the computer device 12 and the interfaces 8,15.

Transaction Types 203

Referring to FIG. 1, the customized transaction environment 10 uses a customized transaction flow, i.e. a defined interaction (e.g. transaction workflow instructions 218, executed by the computer device 12 via the transaction application 113 and/or device browser, and/or by the computer 6,17 of the interface 8,15) between the interface(s) 8,15 and the transaction application 113 of the computer device 12, to provide the consumer 18 with the ability to initiate (or otherwise respond to) a variety of transaction types 203. These transaction types 203 can be encoded (e.g. using transaction type reference codes) in the symbology information 204 of the barcode 200, and are used by the interface(s) 8,15 and the transaction application 113 to direct (via the workflow instructions 218 appropriate to the transaction type 203) the consumer 18 to provide transaction appropriate input data 215 and to present transaction appropriate output data 217 to the consumer 18 (via operation of the user interface 104). One example of output data 217 dependent on the transaction type 203 (e.g. a restaurant bill) would be a set of instructions displayed on the user interface 104 on how to enter a tip amount (e.g. various tip options such as % tip, $ tip, etc.) as well as instructions on how to confirm total meal cost including tip. Alternatively, the merchant transaction type 203 settings can be housed in the storage 110 of the transaction service 20 and not contained in the barcode 200, rather the transaction type 203 settings can be stored as part of the merchant profile 117 (e.g. part of the stored merchant data. Therefore, the barcode 200 would contain a merchant profile identifier that is used to access the merchants transaction type 203 settings by the transaction service 20 associated with the merchant profile 117.

It is recognized that the output data 217 could include definitions on data content (e.g. specific wording of instructions, advertizing content associated with instructions, etc.) and/or data format of instructions (e.g. font type, font colour, background colour, included images, etc.). It is also recognized that the output data 217 could include definitions on content and display format of consumer selections (e.g. drop down menus, data entry fields, etc.) used by the transaction application 113 to facilitate entry of the transaction appropriate input data 215 by the consumer 18.

In view of the above, it is recognized that the input data 215 and the output data 217 can take a variety of different content and form, depending upon the transaction functionality (via the workflow instructions 218 appropriate to the transaction type 203) needed during interaction by the interface 8,15 with the consumer 18 once the transaction 5 is initiated. The input data 215 can include the consumer data 211 (further defined below), which can be obtained from: registration details 117 of the consumer 18 that is stored (in database 110) and available to the merchant device 17 or transaction service device 6; data that is entered or otherwise selected by the consumer 18 using the user interface 104; data that is obtained from the symbology information 204 of the barcode 200, or any combination thereof. It is recognized that the interfaces 8,15, as well as any thick client transaction functionality configured into the transaction application 113, can have stored (in their memory 110) appropriate workflow instructions 218 assigned or otherwise associated with each of the transaction types 203. It is envisioned that knowledge of the workflow instructions 218 for a particular transaction 5 can be accessible and executable by the transaction application 113, the interface 8, the interface 15, or a combination of any of the above.

One obvious difference in workflow instructions 218 and input data 215 requirements for transactions is for those purchases involving a tip option (e.g. sit down restaurant meal) and those that do not (e.g. retail product purchase or take-out meal purchase). Another obvious difference in workflow instructions 218 and input data 215 requirements for transactions is for on-line purchases versus POS purchases, such that the latter mayor may not require consumer address information if the consumer can carry the purchased products themselves.

The following is an example non-exhaustive listing of different transaction types 203 along with their overall associated example instructions pertaining to the input data 215 and the output data 217, as implemented by the respective systems 80,90.

Transaction types 203 can include:

1. Purchase and Delivery of products transaction 5 (e.g. purchase of physical products)

For example, this transaction type 203 can query the consumers profile (consumer registration details 117) on the interface 8,15 for a delivery address and a merchant profile (merchant registration details 117) for delivery charges. Optionally the delivery address can be sent to the merchant interface 8 via the interface 15 in which case the interface 8 returns the delivery charges to the computer device 12 (e.g. via the interface 15 or directly via the network 11). The delivery address and total purchase amount including delivery is presented as the output data 217 to the consumer 18 for acceptance. The consumer 18 may accept, reject or edit the purchase by entering the appropriate input data 215. The consumer 18 can manually edit the delivery instructions by entering the appropriate input data 215. The delivery charges will then be recalculated by once again either looking up the delivery charges in the merchant profile or by sending the delivery address to the interface 8 (e.g. via the interface 15) and returning the charges to the computer device 12 (e.g. via the interface 15). Accordingly, the workflow instructions 218 appropriate (e.g. assigned or otherwise associated) to this transaction type 203 include accepting the consumers' 18 payment, prompt the consumer 18 to select the delivery address, send the address to the merchant who then returns the delivery cost, and input data 215 of payment mode (e.g. indication of credit, debit or other account 70,72 details to complete the purchase.

2. Purchase and deliver with tip transaction 5 (e.g. purchase and delivery of physical products)

This transaction type 203 is similar to the "Purchase and Delivery" purchase type with the exception that the consumer 18 will be prompted for a tip, i.e. food delivery, using tip appropriate input data 215, output data 217 and workflow instructions 218 (e.g. assigned or otherwise associated with the transaction type 203). This transaction type 203 is suitable for the service industry, e.g. waiters, cab drivers, food delivery etc. It provides for a consumer 18 to pay for an order either remotely or in the case of a taxi or restaurant, in person. The consumer 18 will be prompted (via transaction appropriate input data 215, output data 217 and workflow instructions 218 assigned or otherwise associated with the transaction type 203) to select a tip amount, selected as a percentage or entered manually, such that the tip amount is then added to the base amount to provide the consumer 18 with the complete payment due.

3. Purchase and download transaction 5 (e.g. remote purchase of virtual products)

This transaction type 203 provides for the consumer 18 to make a purchase of digital goods. Upon a successful digital content selection and payment (via transaction appropriate input data 215, output data 217 and workflow instructions 218 assigned or otherwise associated with the transaction type 203), the consumer 18 is sent a confirmation including (for example) a single use URL that is used to download the purchased digital content. This transaction type 203 may also be used for the download of free digital goods, wherein payment is not required. i.e. purchase of e-books or digital music. This transaction type 203 provides consumers 18 with the ability to pay for and immediately download digital content, via transaction appropriate input data 215, output data 217 and workflow instructions 218. Merchants 16 can convert, what was here-to-for static media into an instant sales conduit, for example displaying a barcode 200 with a video, a image, or a TV commercial and having customers 18 pay for the digital content and download it. It is recognised that this transaction type 203 can be used for transactions 5 involving the sale of music, digital media, e-books, or software.

4. Purchase and register transaction 5 (e.g. remote purchase of virtual products)

This transaction type 203 allows the consumer 18 to purchase a membership to a site or service that requires registration. i.e. paid memberships. This transaction type 203 can reduce registration time and errors for a site by allowing a consumer 18 to automatically (via transaction appropriate input data 215, output data 217 and workflow instructions 218 assigned or otherwise associated with the transaction type 203) fill out online registration forms by sending information from their consumer profile 117. This transaction type 203 is applicable for companies 16 selling access to a site or service wherein the company 16 requires a full consumer registration i.e. name, address, email address etc. Registration errors can be reduced and registration time reduced by removing the need for the consumer 18 to enter all of the transaction required input data 215, as at least a portion of the registration information is automatically submitted to the site from the transaction service 20 and/or from the consumer data 211 resident on the computer device 12.

5. Register no Purchase transaction 5 (e.g. remote purchase of virtual products)

This transaction type 203 is similar to "Purchase and register" with the exception that payment is not required. i.e. social networking sites. This transaction type 203 can reduce registration times and registration errors. It can be useful for free sites or on-line services such as social media, alumni associations etc. This registration type 203 can also be ideal for trade show attendees and exhibitors. This transaction type 203 provides a process to exchange company and personal contact information with prospective sales leads and suppliers, via transaction appropriate input data 215, output data 217 and workflow instructions 218 assigned or otherwise associated with the transaction type 203. Registration errors can be reduced and registration time is reduced by removing the requirement for the consumer to enter all of the input data 217, as all the registration information is submitted to the site from the transaction service 20 and/or stored consumer data 211 available to the transaction application 113.

6. Lead generation transaction 5

This transaction type 203 facilitates a consumer 18 sending his or her contact information (e.g. consumer data 207) to another individual or organization. i.e. trade shows, using transaction appropriate input data 215, output data 217 and workflow instructions 218 assigned or otherwise associated with the transaction type 203.

7. Purchase with Tip transaction 5 (e.g. purchase of products with no delivery)

This purchase type 203 facilitates a transaction wherein a tip is required. i.e. taxis or restaurants. This transaction type 203 is useful for the service industry i.e. waiters, cab drivers, food delivery etc. It provides for a consumer 18 to pay for an order either remotely or in the case of a taxi or restaurant, in person, using transaction appropriate input data 215, output data 217 and workflow instructions 218 assigned or otherwise associated with the transaction type 203. The consumer 18 will be prompted to select a tip amount. The tip amount can be selected as a percentage or entered manually. The tip amount is then added to the base amount to provide the consumer with the complete payment due.

8. Purchase and Pick up transaction 5 (e.g. purchase of products with no delivery)

This transaction type 203 allows a consumer 18 to purchase product(s) for pickup. It sends the transaction application 113 and the merchant interface 8 the order specifics, payment status and an order pick up number that is paired to an order pick up number sent to the consumer 18, using transaction appropriate input data 215, output data 217 and workflow instructions 218 assigned or otherwise associated with the transaction type 203.

9. User feedback no purchase transaction 5 (e.g. no purchase of products)

This transaction type 203 displays customized screens for consumer feedback, using transaction appropriate input data 215, output data 217 and workflow instructions 218 assigned or otherwise associated with the transaction type 203. No purchase is necessary with this transaction type 203. This transaction type 203 can be used for a wide variety of applications including: surveys, voting for TV reality show contestants, consumer feedback.

10. Purchase with Recurring billing transaction 5 (e.g. recurring purchase of products)

This transaction type 203 facilitates recurring payments for services or products. It allows the consumer 18 to select the amount and frequency of a payment related to the products as well as consumer data 211 details, using transaction appropriate input data 215, output data 217 and workflow instructions 218 assigned or otherwise associated with the transaction type 203. This transaction type 203 can be used for charitable donations (including one time donations where the recurrent payment frequency is selected as zero), utility bill payments, magazine subscriptions etc. This transaction type 203 can prompt the consumer 18 for the duration and amount of the donation. It can also prompt the consumer 18 for a mailing address for tax receipts etc. The transaction service 20 can prompt the consumer 18 to automatically send the charity the information it needs. Further, the transaction type 203 is useful for companies 16 that sell memberships and/or subscriptions, e.g. online sites, magazines, newspapers etc. the transaction 5 can prompt the consumer 18 for the duration of the subscription and present him/her with the payment terms and conditions. For online sites, it can return a username and password to the consumer 18 and can allow access into the site. Registration errors can be eliminated and registration time can be significantly reduced by reducing the need for the consumer 18 to enter all of the input data 215, as at least some of the registration information can be automatically submitted to the site from the stored consumer data 211.

Example Processing Systems 80, 90 Configuration

Figure 2:
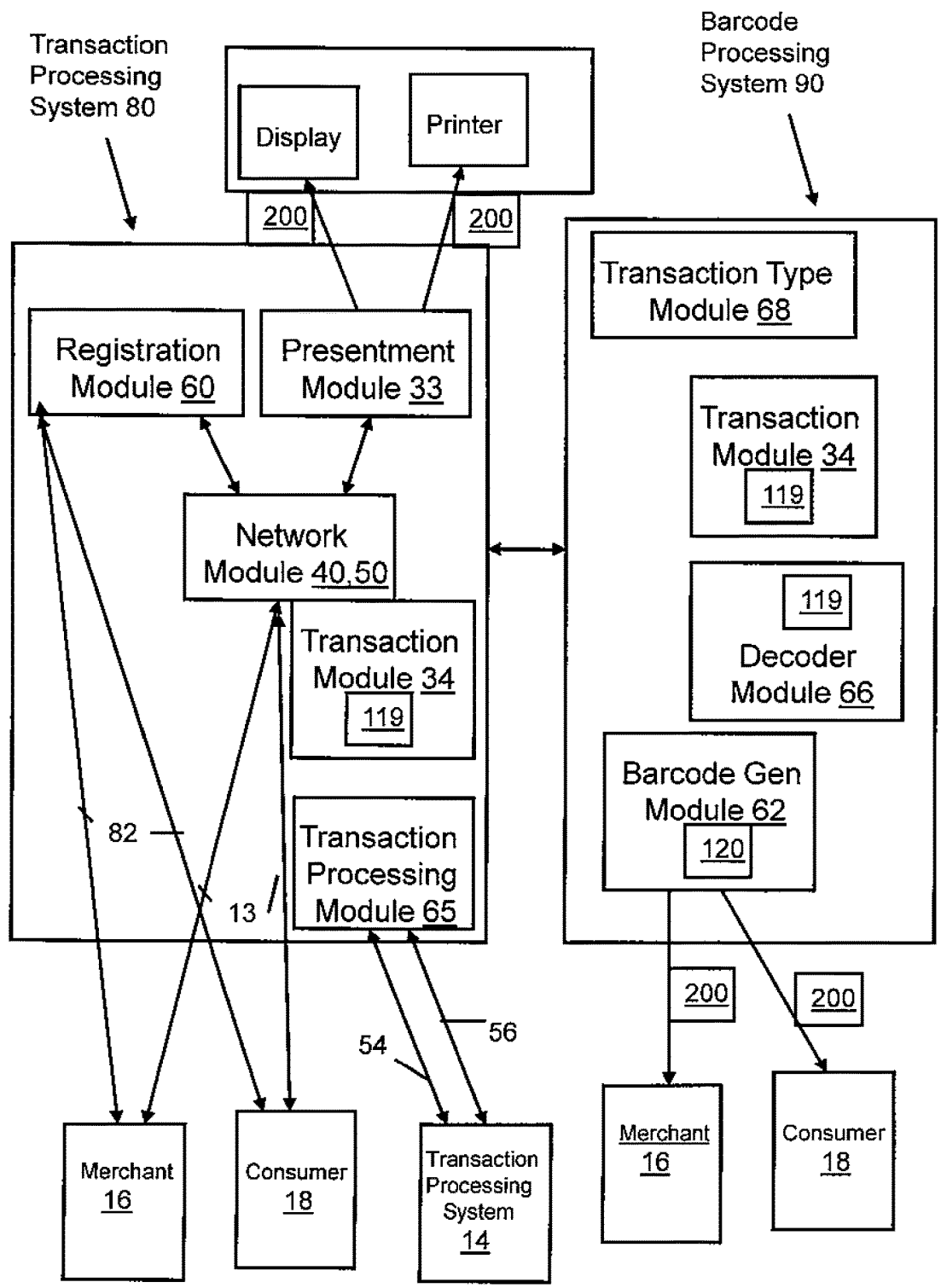
FIG. 2 is a block diagram of an example transaction processing system configuration and an example barcode processing system configuration of the system of FIG. 1.

Referring to FIGS. 1 and 2, the transaction service 20, for example, has the transaction interface 15 including the transaction processing system 80 and the barcode processing system 90, such that the barcode processing system 90 generates the barcode 200 for the merchant 16 (or directly for the consumer 18) and the transaction processing system 80 interacts with the merchant 16 and the consumer 18 to process the transaction 5 there-between upon receipt of the barcode 200 (and/or information obtained from the barcode 200 from a transaction application 113 provisioned on the computer device 12) from the consumer 18. It is also recognized (as shown in FIG. 1) that the merchant interface 8 can also have a transaction processing system 80 and a barcode processing system 90 with similar or differing (e.g. complimentary) functionality to that of the systems 80,90 of the transaction interface 15.

In any event, the following is an illustrative descriptive example of the basic functionality of the processing system 80 and the barcode system 90 for implementation by the merchant interface 8, the transaction interface 15, or a combination thereof. Subsequent sections provide more specific implementation examples of various components of the processing system 80 and the barcode system 90 (e.g. network modules 40,50, barcode generation modules 32, 62, decoder modules 66 (including transaction modules 34), registration modules 60, presentment modules 33, and transaction generation module 30). It is recognized that any functionality related to barcode generation can be implemented by the processing system 80 and any transaction processing related functionality can be implemented by the barcode system 90, interchangeably as desired. It is also recognized that the systems 80,90 communicate with one another, as needed.

Referring to FIG. 2, the processing system 80 has a registration module 60 for via registration messages 82 (via network 11 with the devices 12,17) with the consumer 18 and the merchant 16: registering merchants 16 for interaction with the transaction service 20 and creates a merchant profile (e.g. merchant registration details 117 that can include stored merchant data 208); registering consumers 18 for interaction with the transaction service 20 and creates a consumer profile (e.g. consumer registration details 117 that can include stored consumer data 211). Also included is a network communication module 40,50 for communicating network messages 13 (and other specific network messages as provided below) between the computer device 12 and the interfaces 8,15 and between the interfaces 8,15, for example. The network messages 13, in general, provide for communication of unencoded merchant, consumer, and product information 201, symbology information 204 in the form of the generated barcode 200, confirmation information denoting whether the transaction 5 has been successfully processed by the interfaces 8,15 and/or the transaction processing system 14, transaction request messages from the computer device 12 requesting processing of the transaction 5 (including information 201 decoded from the barcode 200 and/or symbology information 204 in or otherwise from the barcode 200 in unencoded form), and any other network message described herein related to request and response messages for transaction 5 processing. Also included is a transaction generation module 30 configured to collect the various information 201 (e.g. product data 206, merchant data 208, transfer or invoice data 210, consumer data 211, and/or transaction type data 203) for conversion into the symbology information 204 by the barcode system 90. Also included can be a presentment module 33 for configuring the generated barcode 200 for display on a display and/or for printing on a physical medium.

Also included can be a transaction processing module 65 for coordinating funds transfer instructions between financial accounts 70,72 settled by the transaction processing system 14, using network messages 54,56. Also included can be a transaction request module 34, which can be configured to generate a transaction 5 request to the transaction service 20 including decoded information of the barcode 200 where appropriate.

Referring to FIG. 2, the barcode system 90 has a barcode generation module 62 that uses an encoder 120 to encode the obtained unencoded merchant and product information 201, optionally the transaction type data 203, as well as any other of the product data 206, merchant data 208, transfer r invoice data 210, consumer data 211, into the symbology information 204 for inclusion in the generated barcode 200, for subsequent delivery to the consumer environment 4 (e.g. via the merchant 16) and/or directly to the consumer 18. Also included is a transaction module 34 and/or decoder module 66 that uses a decoder 119 to decode the obtained symbology information 204 from the received barcode 200 into merchant and product information 201, optionally the transaction type data 203, as well as any other of the product data 206, merchant data 208, transfer or invoice data 210, consumer data 211.

Also included is a transaction type module 68 that is configured to select the appropriate workflow instructions 218, input data 215 and output data 217 required by the transaction 5 associated with the transaction type 203 obtained from the barcode symbology information 204. Based on the appropriate workflow instructions 218, input data 215 and output data 217 associated with the transaction 5, the transaction type module 68 provides the content (or processes the expected content) of the network messages 13 in interaction between the computer devices 6,12,17.

Example Transaction 5 Process

Figure 4:
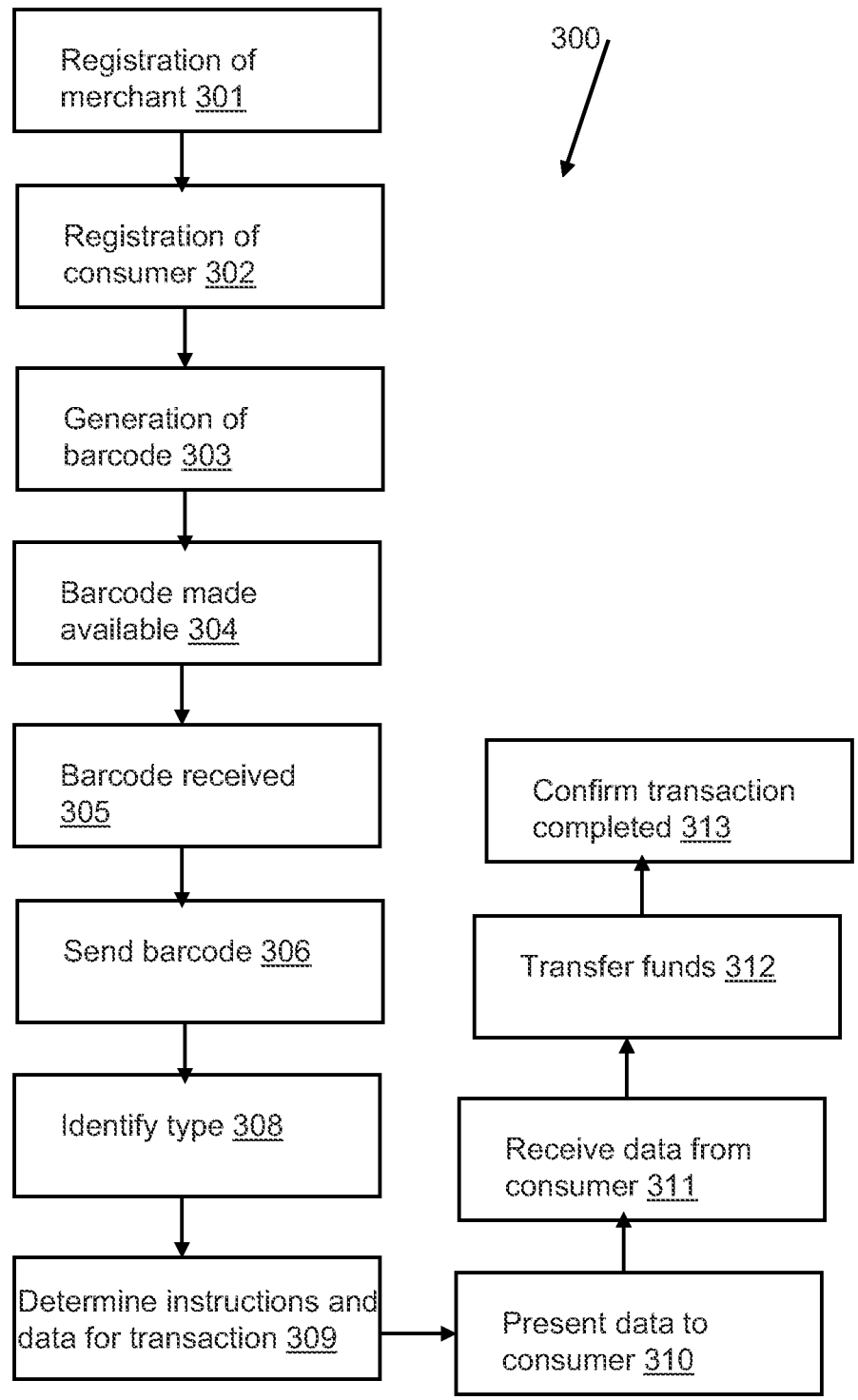
FIG. 4 is an example operation of the system of FIG. 1.

Referring to FIG. 4, shown is an example transaction process 300 for initiating and processing the transaction 5 (see FIG. 1) between the various devices 6,12,17 and system 14.

At step 301, a merchant 16 registers with the transaction service 20 by providing merchant data 208 to the registration module 60 and creates a merchant profile 117 stored in the storage 110. For example, the merchant profile 117 can contain the specifics (i.e. merchant parameters) of the products they are offering, as well as configured (e.g. the merchant can update their own profile details 117) to include profile specifics such as but not limited to whether or not they deliver, deliver charges, whether or not a tip is required etc. It is recognised that the merchant profile 117 parameters are used to define the transaction type 203 associated with barcodes 200 that are used by or otherwise requested from the transaction service 20. It is also recognised that the merchant parameters of the merchant profile 117 can include financial account information of the merchant 16 (e.g. bank account numbers, PIN numbers, etc.).

At step 302, the consumer can install the transaction application 113 on his/her computer device 12 and optionally register with the transaction service 20 by providing consumer data 211 to the registration module 60 and create a consumer profile 117 stored in the storage 110. For example, the consumer profile 117 can contain the specifics (i.e. consumer parameters) of the consumer 18 (e.g. consumer address, financial account information, etc., as well as configured (e.g. the consumer can update their own profile details 117) to include profile specifics such as but not limited to what transaction types 203 are authorized (or not authorized—i.e. prohibited) by the consumer 18, maximum transaction amounts for one or more of the transaction types, etc. It is recognised that the consumer profile 117 parameters can be used to influence the transaction type 203 associated with the barcodes 200 that are used by or otherwise requested from the transaction service 20, from the consumer environment 4, and/or directly from the merchant 16.

At step 303, the merchant 16 requests, via network message 13 with the transaction interface 15, that the transaction service 20 generate (via the system 90) a barcode 200 relevant to the product and transaction type 203 the merchant 16 wishes to make available to the consumer 18. At step 304, the transaction interface 15 sends (via the network modules 40,50) the generated barcode 200 to the merchant interface 8 of the merchant computer 17 (who then makes the barcode 200 available to the consumer environment 4) or otherwise makes the barcode 200 available in the consumer environment 4 on behalf of the merchant 16 (e.g. publishes the barcode 200 directly in an online magazine). Alternatively, either the merchant 16 or the transaction service 20 can send (via the network module 40,50) the barcode 200 directly to the consumer 18 via the network 11. It is envisioned that step 302 can also include the case where the consumer 18 captures an image of the barcode 200 using the imager 118 as described. The barcode 200, when generated, identifies the merchant and reflects all of their profile parameters as appropriate to the transaction type 203 of the transaction 5 associated with the barcode 200. The barcode 200 can be generated statically or dynamically, wherein statically means that the barcode 200 is generated beforehand and placed on or in the appropriate medium (e.g. electronic or physical) available in the consumer environment 4, and wherein dynamically means that the barcode 200 is generated on an as needed basis (e.g. on a per transaction 5 basis such as when the consumer 18 is at the merchant POS or is shopping at the merchant's on-line store and is requesting purchase of selected on-line products).

It is also recognised as an alternative to step 303, the merchant 16 can generate the barcode 200 themselves using their own systems 80,90 of the merchant interface 8.

At step 305, the consumer 16 receives the barcode 200 by their transaction application 113 (e.g. via network messages 13 and/or by capturing the barcode image using the imager 118).

At step 306 the consumer 18, via the transaction application 113, sends (via the network module 40,50) the barcode 200 to the transaction interface 15 and at step 307 the transaction interface 15 decodes (via the decoder module 66) the barcode 200 and confirms (via the transaction type module 68) the correct merchant profile 117 information using the identified merchant 16 in the barcode information. Alternatively, at step 306, the transaction application 113 can send symbology information 204 and/or decoded textual information 201 to the transaction service 20, rather than just the barcode 200 itself. Alternatively, at step 306, the transaction application 113 can send symbology information 204 and/or decoded textual information 201 to the transaction service 20 via the merchant interface 8, rather than directly to the transaction service 20.

At step 308, the transaction interface 15 identifies (via the transaction type module 66) the correct transaction type 203 from the barcode 200 (e.g. for the specific merchant 16 and consumer 18 combination) and thereby configures the systems 80,90 for subsequent interaction with the consumer 18 according to the appropriate transaction type 203 (e.g. selects the appropriate input data 215, output data 217 and transaction workflow instructions 218 from the registration details 117 associated with the transaction type 203).

At step 309, for example the transaction type module 66, delivers to the transaction application 113 screens that are appropriate for the transaction type 203 retrieved from the merchant profile 117. For example, if the transaction 5 requires delivery the transaction type module 66 will determine, by looking at the merchant profile 117, whether the merchant 16 has a fixed or dynamic delivery cost. If the delivery cost is dynamic the transaction type module 66 will determine whether the delivery rates are included in the merchant profile 117 or whether the required information needs to be requested/received via network messages 13 to/from the merchant interface 8 for the merchant 16 to calculate and return the delivery charges (via the transaction module 34). In either case the merchant interface 8 returns this data (output data 217 either directly or indirectly via the transaction interface 15) to the transaction application 113 so that it is displayed on screen for the consumer 18 to review. Optionally the barcode 200 data can indicate that the transaction type 203 is "Register no Purchase" in which case the transaction interface 15 will query (via the transaction type module 34) the merchant profile 117 to determine what information is being requested from the consumer 18 for registration At step 310, the transaction interface 15 populates said screens with information (e.g. output data 217) specific to the transaction 5 that has been initiated. Depending on transaction type 203, said information may include consumer profile information or sales amount, default delivery charges, delivery address' etc.

At step 311, the consumer 18 accepts edits or declines the transaction by entering input data 215 (e.g. including specification of payment account selected and relevant PIN information if needed) via the transaction application 113, which is then sent to the merchant interface 8 or directly to the transaction interface 15.

At step 312, the transaction service 20 via the transaction processing module 65 communicates via messages 54,56 with the transaction processing system 14, if required in the case where the transaction 5 involves a transfer of funds between accounts 70,72, to cause the transaction processing system 14 to debit and credit the appropriate accounts 70,72 of the consumer 18 and merchant 16.

At step 313, upon completion of the transaction 5, the merchant 16 and the consumer 18 are sent a transaction confirmation message 13 including relevant transaction settlement details.

Alternative to the above, a further embodiment of the operation of the transaction 5 environment is as follows.

a) the consumer 18 scans a barcode 200 (or manually enters a merchant code);

b) the transaction application 113 decodes the barcode 200 and retrieves a transaction id 210 and a merchant profile code 208;

c) The transaction application 113 sends the decoded information to the transaction interface 15 including consumer identification information 211;

d) the transaction interface 15 looks up the merchant profile code and the transaction id (and a unique hash tag—as a non-hierarchical keyword or term assigned to the barcode 200 as a kind of metadata helping to describe/define the barcode and allows it to be referenced) to identify the particular barcode 200. The barcode 200 may also contain pricing information 206 of the product associated with the transaction 5;

e) the transaction 5 is matched to an open transaction for the specific merchant 16. For example there may be many transactions with the merchant id "1000" but only 1 transaction number 1000 per merchant 16;

f) the merchant profile id 208 is used to access the merchant profile 117 setting on the transaction interface 15. The merchant profile 117 contains the merchant transaction type 203 settings for the barcode 200;

g) once determining the transaction type 203 the transaction interface 15 delivers the appropriate screens involving data 215, 217 and instructions 218 to the transaction application 113;

h) the consumer 18 makes the transaction dependent choices (e.g. supplies the input data 215 including any financial account information that may be requested) by the transaction application 113 using the user interface 104. The transaction application 113 can interact with the transaction interface 15 to display and/or enter and/or access any or all of the consumers profile information 211 that is needed to complete the transaction 5;

i) the consumer can enter their PIN number to accept the transaction 5 in the case where financial information and PIN information are needed for the transaction 5;

j) at this point the transaction interface 15 will send the transaction 5 details to the merchant interface 8 and process the payment if necessary, e.g. via the payment processing system 14. The transaction details may include information such as delivery address, consumers name, email address etc.; and k) if needed the transaction interface 15 will debit the appropriate funds from the consumers account 70 and deposit them in the merchants account 72, for example via payment processing system 14 and make any settlement details available to the computers 12,17.

An alternative embodiment of the operation of the system 10 can be where the transaction interface 15 coordinates processing of the transaction 5 between the consumer 18 and the merchant 16, the transaction 5 associated with the merchant 16 providing a product to the consumer 18. The processing of the transaction interface 15 including: receiving transaction information of the transaction 5 including merchant identification information, consumer identification information and a transaction identifier associated with the barcode 200; accessing a database of profile data 117 using the merchant identification information to determine the transaction type 203 of the transaction 5; sending output data 217 via the communications network 11 by using workflow instructions associated with the transaction type 203, the output data 217 for consumption by the consumer device 12 of the consumer 18; receiving input data 215 from the consumer device 12 and including the input data 215 with the transaction information to generate the transaction request; and sending the transaction request via the communications network 11 to the merchant interface 8 of the merchant 16 to complete the transaction 5 with the merchant 16.

An alternative embodiment of the operation of the system 10 can be for generating the transaction request for receipt by the transaction interface 15 over the communications network 11, the transaction 5 of the transaction request associated with the merchant 16 providing the product to the consumer 18, including: receiving the barcode 200 by the transaction application 113 including symbology information 204 having encoded transaction information of the transaction 5, the transaction information including merchant identification information and a transaction identifier (e.g. transaction type 203, transaction ID such as the hashtag or other identifier value, etc.) associated with the barcode 200; sending the transaction request including the transaction information to the transaction interface 15, the barcode 200 associated with the transaction type 203 of a plurality of transaction types 203; receiving output data 217 from the transaction interface 15 based on workflow instructions 218 associated with the transaction type 203, the output data 217 for consumption by the transaction application 113; sending input data 215 to the transaction interface 15 based on the output data 217, the input data 215 for including with the transaction information already received by the transaction interface 15; and receiving a transaction response including confirmation information of processing of the transaction 5.

Computer Device 12

Figure 5:
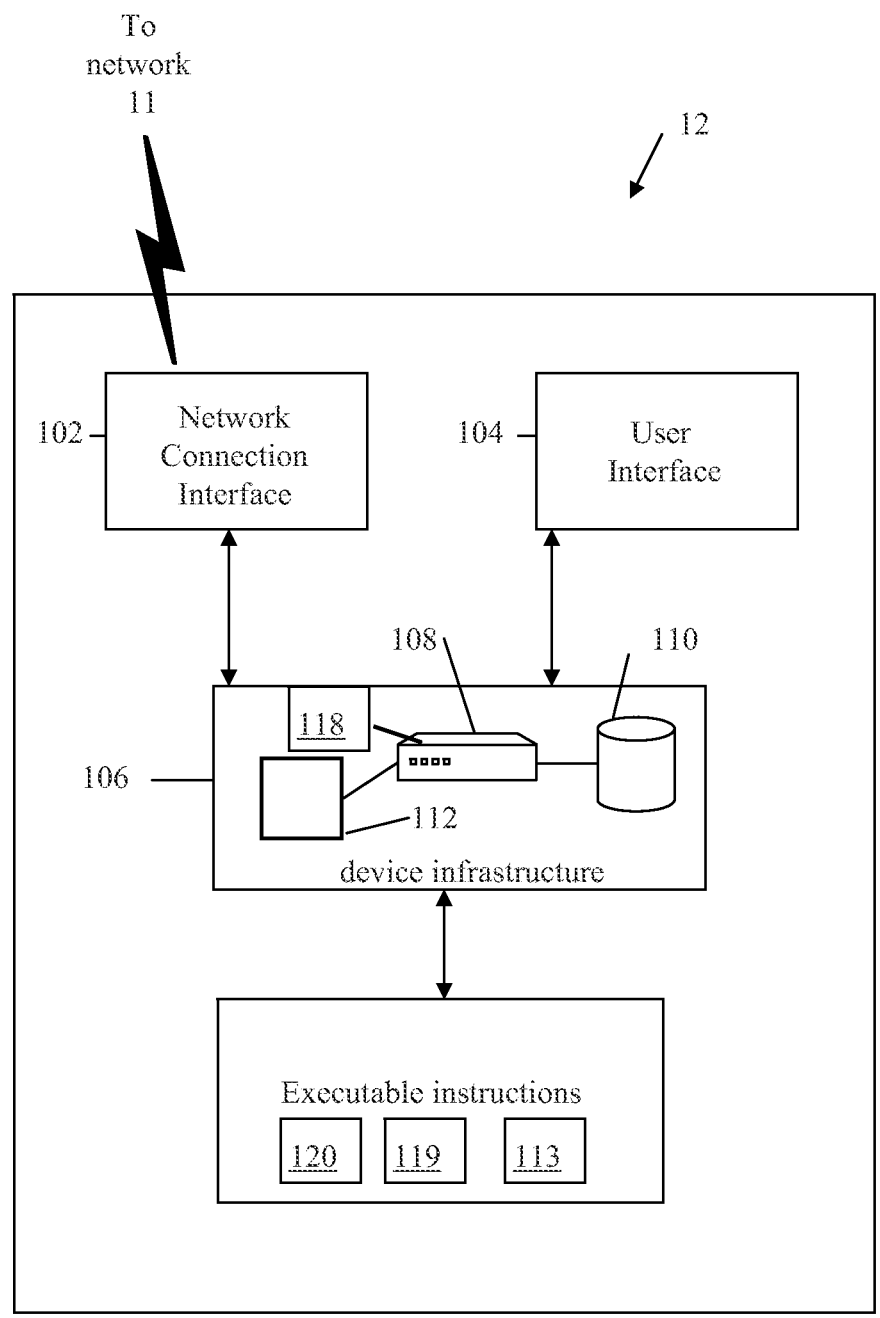
FIG. 5 is a block diagram of a computer device implementing the transaction application of FIG. 1.

Referring to FIG. 5, each computer device 12 can be a wireless-enabled (e.g. WiFi, WAN, etc.) personal data assistant, or email-enabled wireless telephone, or a desktop computer terminal. In addition, the wireless communications are not limited to only facilitating transmission of text data (e.g. encrypted) and can therefore be used to transmit image data, audio data or multimedia data, for example, as desired.

As shown in FIG. 5, the computer device 12 comprises a communication network interface 102, a user interface 104, and a data processing system 106 in communication with the network interface 102 and the user interface 104. The network interface 102 can include one or more antennas for wireless communication over the communications network 11. Preferably, the user interface 104 comprises a data entry device (such as keyboard, microphone or writing tablet), and a display device (such as an LCD display). The display screen of the user interface 104 can be used to visually present a graphical user interface (GUI) of the transaction application 113 to the user, including results of the barcode 200 image capture process and processing. The display screen can employ a touch screen display, in which case the user can manipulate (i.e. enter and/or modify/delete) transaction 5 information (e.g. product data 206, merchant data 208, consumer data 211 and/or transaction data 210) obtained as textual invoice information 201 from the decoded barcode 200 and/or as supplemental information (e.g. merchant data 208, consumer data 211) added to the textual invoice information 201 in order to generate the transaction request 64 Network message 13).

The data processing system 106 includes a central processing unit (CPU) 108, otherwise referred to as a computer processor, and a non-volatile memory storage device (e.g. DISC) 110 (such as a magnetic disc memory or electronic memory) and a read/write memory (RAM) 112 both in communication with the CPU 108. The memory 110 includes data which, when loaded into the RAM, comprise processor instructions for the CPU 108 which define memory objects for allowing the computer device 12 to communicate with one another and the transaction service 20 (for accessing the transaction interface 15) and the merchant interface 8 (e.g. one or more processing servers) over the communications network 11. The processor instructions for the CPU 108 will be discussed in greater detail below.

The CPU 108 is configured for execution of the transaction application 113 (including for example some or all of the system 80,90 functionality) for facilitating communication between the computer device 17 and the computer device 6 of the transaction service 20. For example, it is recognised that the transaction application 113 is used to coordinate, as implemented by the CPU 108, the generation, receipt, and processing of the barcode 200 and the transaction 5 messages 13. For example, the transaction application 113 can operate the imager 118 and the encoder/decoder 119,120.

The CPU 108 facilitates performance of the computer device 12 configured for the intended task (e.g. of the respective module(s) of the transaction application 113) through operation of the network interface 102, the user interface 104 and other application programs/hardware (e.g. web browser made available to the transaction application 113) of the computer device 12 by executing task related instructions. These task related instructions can be provided by an operating system, and/or software applications located in memory, and/or by operability that is configured into the electronic/digital circuitry of the processor(s) 108 designed to perform the specific task(s), including operation of the modules associated with the functionality of the systems 80,90. Further, it is recognized that the device infrastructure 106 can include a computer readable storage medium 110 coupled to the processor 108 for providing instructions to the processor 108 and/or to load/update the instructions. The computer readable medium 110 can include hardware and/or software such as, by way of example only, memory cards such as flash memory or other solid-state memory.

Further, it is recognized that the computer device 12 can include the executable applications comprising code or machine readable instructions for implementing predetermined functions/operations including those of an operating system, the imager 118, the decoder 119, the encoder 120 and the transaction application 113, and the browser, for example. The processor 108 as used herein is a configured device and/or set of machine-readable instructions for performing operations as described by example above, including those operations as performed by any or all of the imager 118, the decoder 119, the encoder 120 and the transaction application 113. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example.

The data processing system 106 includes the imager 118 (e.g. a camera including an image sensor—e.g. CCD or CMOS sensor) suitable for capturing images of the barcode 200 displayed or otherwise presented by the merchant 16 within range of the imager 118. The transaction application 113 is configured to control the operation of the imager 118 to capture the image of the barcode 200, as well as to operate the decoder 119 to provide for decoding at least a portion of the symbology information 204 into textual invoice information 201, if so configured, for subsequent use in generating the transaction request message 13 directed to the transaction service 20. The storage 110 can also contain the customized coding interpretation scheme 209 for use in decoding/encoding the barcode 200.

Transaction Service Device 6

Figure 6:
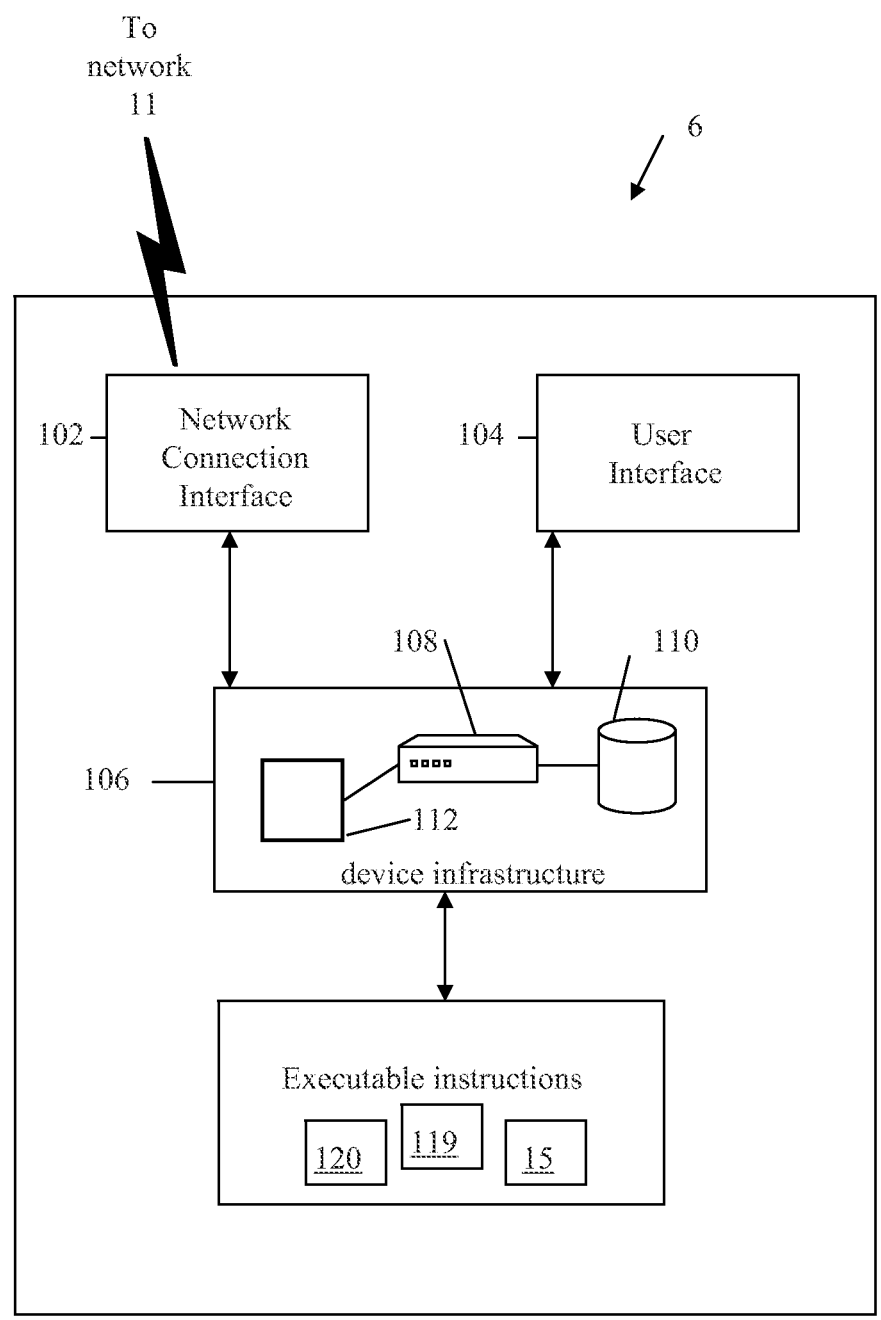
FIG. 6 is a block diagram of a computer device implementing the transaction service of FIG. 1.

Referring to FIG. 6, the device 6 can be a wireless-enabled (e.g. WiFi, WAN, etc.) personal data assistant, or email-enabled wireless telephone, for example a tablet. In addition, the wireless communications are not limited to only facilitating transmission of text data (e.g. encrypted) and can therefore be used to transmit image data, audio data or multimedia data, for example, as desired. Preferably, the device 6 is a network server.

As shown in FIG. 6, the device 6 can comprise a communication network interface 102, a user interface 104, and a data processing system 106 in communication with the network interface 102 and the user interface 104. The network interface 102 can include one or more antennas for wireless communication over the communications network 11. The user interface 104 can comprise a data entry device (such as keyboard, microphone or writing tablet), and a display device (such as an LCD display).

The data processing system 106 includes a central processing unit (CPU) 108, otherwise referred to as a computer processor, and a non-volatile or volatile memory storage device (e.g. DISC) 110 (such as a magnetic disc memory or electronic memory) and a read/write memory (RAM) 112 both in communication with the CPU 108. The memory 110 includes data which, when loaded into the RAM, comprise processor instructions for the CPU 108 which define memory objects for allowing the device 6 to communicate with the computer devices 17,12 and the transaction processing system 14 (e.g. one or more processing servers) over the communications network 11. The instructions can be used to provide or otherwise host the transaction interface 15 as a website running on the computer device 6 and accessed via the network 11.

The CPU 108 is configured for execution of the transaction interface 15 for facilitating communication with the transaction processing system 14 and the computer devices 17,12. For example, it is recognised that the transaction interface 15 is used to coordinate, as implemented by the CPU 108, the generation, receipt, and processing of the textual invoice information 201 and the symbology information 204 of the barcode 200, as well as coordinating the settlement of funds transfer of the transaction 5, if any, between the specified accounts 70,72.

The CPU 108 facilitates performance of the device 6 configured for the intended task (e.g. of the respective module(s) of the transaction interface 15) through operation of the network interface 102, the user interface 104 and other application programs/hardware (e.g. web service made available through the transaction interface 15) of the device 6 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include the computer readable storage medium 110 coupled to the processor 108 for providing instructions to the processor 108 and/or to load/update the instructions. The computer readable medium 110 can include hardware and/or software such as, by way of example only, memory cards such as flash memory or other solid-state memory. The storage 110 can also contain the customized coding interpretation scheme 209 for use in encoding and/or decoding the barcode 200.

Further, it is recognized that the device 6 can include the executable applications comprising code or machine readable instructions for implementing predetermined functions/operations including those of an operating system and the modules associated with any of the functionality of the systems 80,90 for example. The processor 108 as used herein is a configured device and/or set of machine-readable instructions for performing operations as described by example above, including those operations as performed by any or all of the modules associated with any of the functionality of the systems 80,90. As used herein, the processor 108 may comprise any one or combination of, hardware, firmware, and/or software. The processor 108 acts upon information by manipulating, analyzing, modifying, converting or transmitting information for use by an executable procedure or an information device in relation to transaction 5 processing, and/or by routing the information with respect to an output device. The processor 108 may use or comprise the capabilities of a controller or microprocessor, for example.

Merchant Device 17

Figure 7:
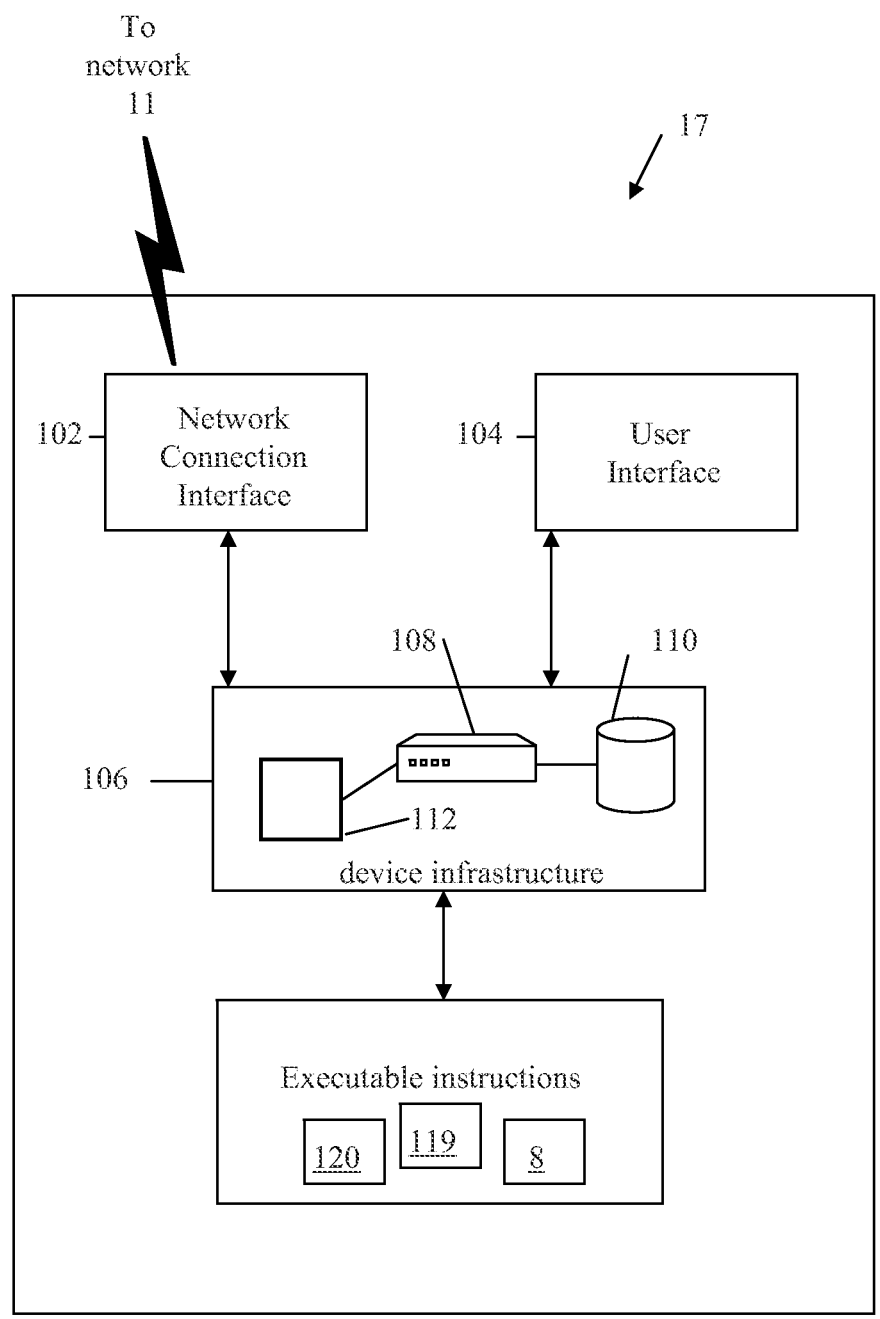
FIG. 7 is a block diagram of a computer device implementing the merchant interface of FIG. 1.

Referring to FIG. 7, the device 17 can be a wireless-enabled (e.g. WiFi, WAN, etc.) personal data assistant, or email-enabled wireless telephone, for example a tablet. In addition, the wireless communications are not limited to only facilitating transmission of text data (e.g. encrypted) and can therefore be used to transmit image data, audio data or multimedia data, for example, as desired. The device 17 can also be a network server or an association of computer devices, both wired and wireless.

As shown in FIG. 7, the device 17 can comprise a communication network interface 102, a user interface 104, and a data processing system 106 in communication with the network interface 102 and the user interface 104. The network interface 102 can include one or more antennas for wireless communication over the communications network 11. The user interface 104 can comprise a data entry device (such as keyboard, microphone or writing tablet), and a display device (such as an LCD display).

The data processing system 106 includes a central processing unit (CPU) 108, otherwise referred to as a computer processor, and a non-volatile or volatile memory storage device (e.g. DISC) 110 (such as a magnetic disc memory or electronic memory) and a read/write memory (RAM) 112 both in communication with the CPU 108. The memory 110 includes data which, when loaded into the RAM, comprise processor instructions for the CPU 108 which define memory objects for allowing the device 6 to communicate with the computer devices 6,12 over the communications network 11. The instructions can be used to provide or otherwise host the merchant interface 8 as a website running on the computer device 17 and accessed via the network 11.

The CPU 108 is configured for execution of the merchant interface 8 for facilitating communication with the computer devices 6,12. For example, it is recognised that the merchant interface 8 is used to coordinate, as implemented by the CPU

108, the generation, receipt, and processing of the textual invoice information 201 and the symbology information 204 of the barcode 200, as well as coordinating the transfer of data 206,208,210,211,203 via network messages 13 between the devices 6,12,17.

The CPU 108 facilitates performance of the device 17 configured for the intended task (e.g. of the respective module(s) of the merchant interface 8) through operation of the network interface 102, the user interface 104 and other application programs/hardware (e.g. web service made available through the merchant interface 8) of the device 17 by executing task related instructions. These task related instructions can be provided by an operating system, and/or software applications located in memory, and/or by operability that is configured into the electronic/digital circuitry of the processor(s) 108 designed to perform the specific task(s). Further, it is recognized that the device infrastructure 106 can include the computer readable storage medium 110 coupled to the processor 108 for providing instructions to the processor 108 and/or to load/update the instructions. The computer readable medium 110 can include hardware and/or software such as, by way of example only, memory cards such as flash memory or other solid-state memory. The storage 110 can also contain the customized coding interpretation scheme 209 for use in encoding and/or decoding the barcode 200.

Further, it is recognized that the device 17 can include the executable applications comprising code or machine readable instructions for implementing predetermined functions/operations including those of an operating system and the modules associated with any of the functionality of the systems 80,90 for example. The processor 108 as used herein is a configured device and/or set of machine-readable instructions for performing operations as described by example above, including those operations as performed by any or all of the modules associated with any of the functionality of the systems 80,90. As used herein, the processor 108 may comprise any one or combination of, hardware, firmware, and/or software. The processor 108 acts upon information by manipulating, analyzing, modifying, converting or transmitting information for use by an executable procedure or an information device in relation to transaction 5 processing, and/or by routing the information with respect to an output device. The processor 108 may use or comprise the capabilities of a controller or microprocessor, for example.

Example Merchant Interface 8

The merchant interface 8 can be configured as a thick client of the barcode generation capabilities (barcode generation module 62) of the transaction service 20, such that the merchant interface 8 is provisioned with transaction and/or barcode processing functionality similar to (or at least a portion of) that functionality of the transaction processing system 80 and/or barcode processing system 90 as described above for the transaction service 20 and below as further examples of the system 80,90 functionality. It is recognized that the thick client version of the merchant interface 8 could be configured to perform some of the barcode processing on behalf of or otherwise in substitution of any of the processing functionality of the barcode processing/generation system implemented by the transaction service 20 during processing of the transaction 5. It is also recognized that the thick client version of the merchant interface 8 could also be configured to communicate over the network 11 via a series of web pages as generated or otherwise received by the merchant interface 8, sent as network messages between the computer device 17 and the transaction service 20. It is also recognized that the merchant interface 8 could request or otherwise obtain the barcodes 200 pertaining to the transaction 5 directly from the transaction service 20, i.e. operating as a thin client of the transaction service 20, rather than directly generating the barcodes 200 using systems of the merchant interface 8 itself. In either case, the following description of the barcode module 62 can be representative of the barcode generation capabilities of the barcode module 62 of the merchant interface 8 and/or of the barcode module 62 of the transaction service 20, as desired.

Figure 8:
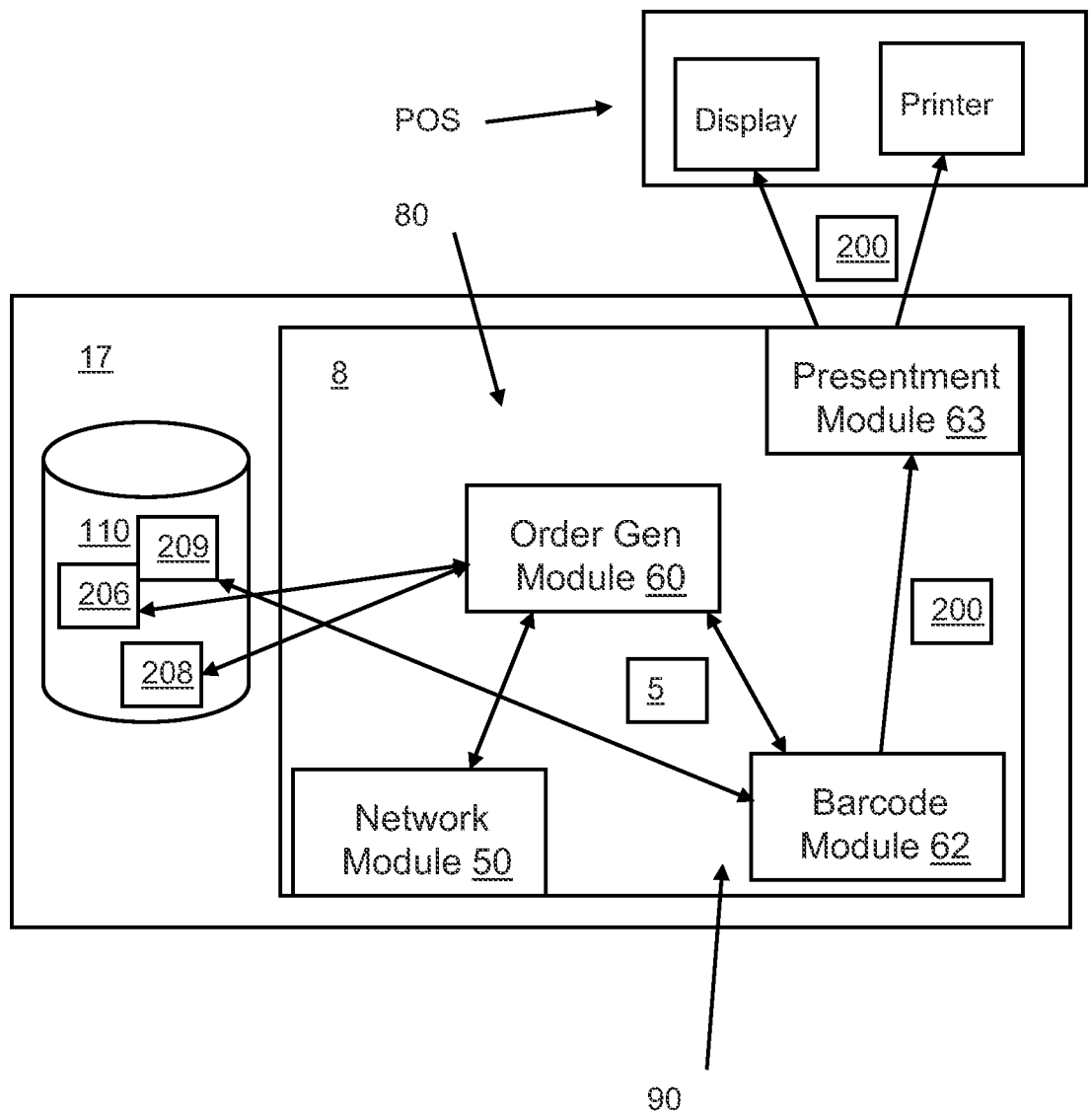
FIG. 8 is a block diagram of a merchant interface of FIG. 1.

Referring to FIG. 8, shown is an example configuration of the merchant interface 8 that can include a network communications module 50 for receiving order request messages from the computer device 12 and for sending order response messages to the computer device 12 over a communication network 11. The communication network 11 can be a one or more networks, for example such as but not limited to: the Internet; an extranet; and/or an intranet. Further, the communication network 11 can be a wired or wireless network. It is also recognized that network messages can be communicated between the computer device 12 and the network communications module 50 via short range wireless communication protocols such as but not limited to Bluetooth™, infrared (IR), radio frequency (RF), near field communication (NFC) and other protocols as desired.

The network communications module 50 can also be configured to send and receive order confirmation messages over the communications network 11 with respect to the payment transaction processing system 14. Also included is a database 110 containing product data 206 (e.g. product pricing, product descriptions, product availability, etc.), merchant data 208 (e.g. merchant bank account number, a unique merchant reference ID of the merchant assigned by the transaction interface 15, tax or merchant business registration details), and network 11 address information of the transaction interface 15. The database 110 can also have customized barcode definitions of a customized coding scheme 209 containing relationships (e.g. rules) between machine readable symbology and codewords used to encode (or decode) invoice information during generation of the aggregated barcode 200 used to represent the transaction 5.

For example, the customized coding scheme 209 can be used to encode (i.e. translate) unencoded (e.g. text based) invoice information 201 of the transaction 5 into symbology information 204, performed during generation of the aggregated barcode 200. The customized coding scheme 209 can also be used to decode (i.e. interpret) symbology information 204 present in the aggregated barcode 200 into unencoded invoice information 201 of the transaction 5 during processing of the aggregated barcode 200 (e.g. by the computer device 12 and/or the transaction interface 15). It is recognized that the customized coding scheme 209 is known to the transaction interface 15 (e.g. by its barcode generation module 62) and can include customized codewords pertaining to specific invoice information such as but not limited to: merchant ID, customer ID; invoice amounts; invoice number; etc.

Figure 3:
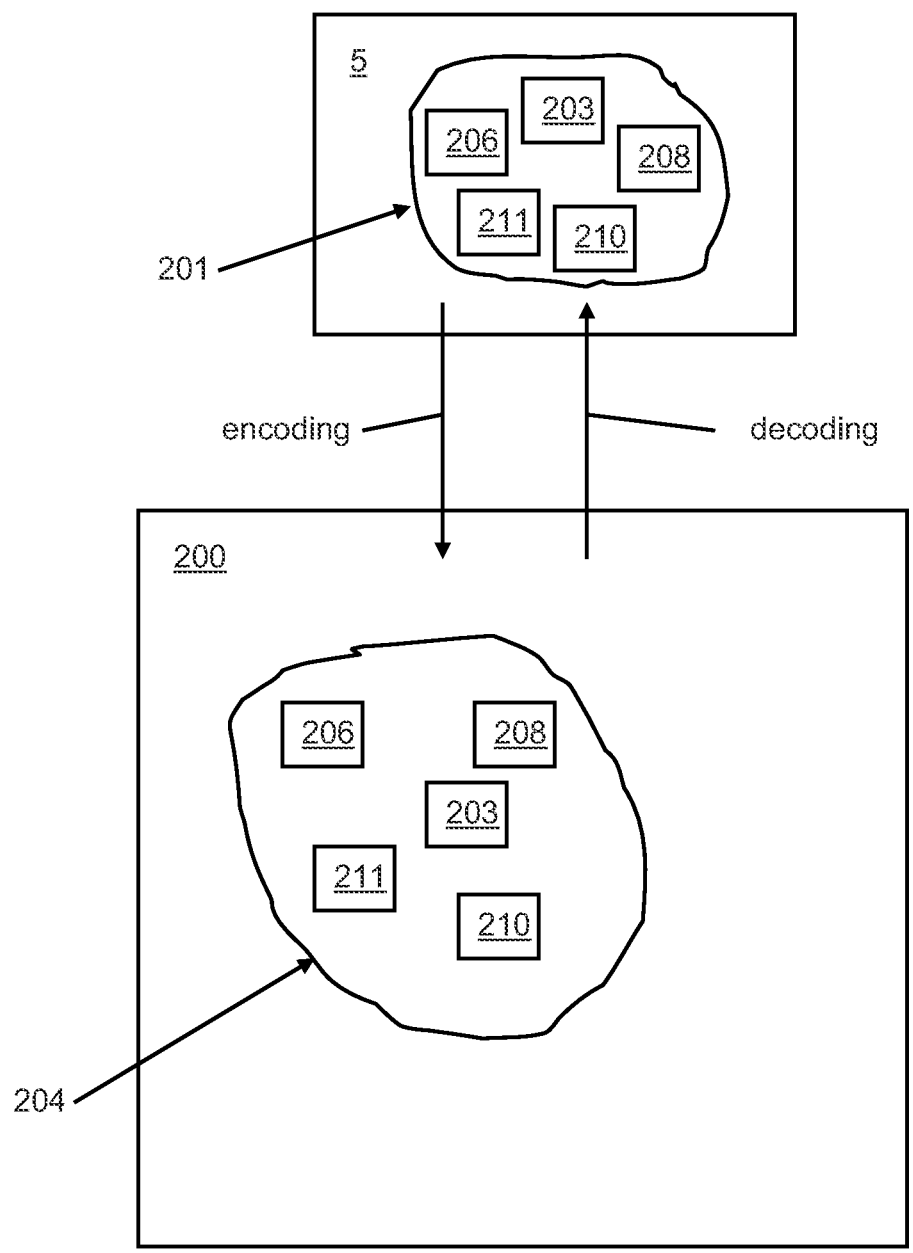
FIG. 3 shows example encoded and unencoded information for the system of FIG. 1.

Referring again to FIG. 8, the merchant interface 8 also has an order generation module 60 used to collect the transaction 5 data (e.g. product data 206, merchant data 208, customer data 209 and/or transaction data 210—see FIG. 3) for the plurality of products ordered/selected by the customer 18 during interaction (e.g. online) with the merchant interface 8 via the computer device 12 (e.g. over the communications network 11). It is recognized that product data 206 and some of the customer data 211 of the transaction 5, such as specific products ordered and quantity of each product, could be provided to the order generation module 60 obtained from order request messages (e.g. via the network communications module 50). Further, the order generation module 60 would collect (or otherwise receive) the merchant data 208 for the transaction 5 from the database 110 as well as pricing information (e.g. product data 206) of the ordered products. The order generation module 60 also generates the transaction data 210 pertaining to product pricing total (optionally including applicable taxes) that includes the total invoice amount owed by the customer and merchant identification information (associated with or otherwise embodying the merchant bank account information) of the transaction 5. For example, in terms of the merchant bank account information, this could be supplied as part of the merchant information included in the transaction 5 data or this could be supplied as a merchant identification information (e.g. merchant ID) used by the transaction interface 15 to lookup the actual merchant bank account information known to the transaction interface 15 and therefore abstracted from the customer 18.

The merchant interface 8 has the barcode module 62 that can be configured to use the available transaction 5 data and the customized coding scheme 209 to generate the aggregated barcode 200. It is recognized that the aggregated barcode 200 can be generated by the barcode module 62 to contain data of the transaction 5 pertaining to the product(s) chosen by the customer 18, including payment transaction data needed by the processing system 14 or transaction interface 15 to settle the transaction (associated with the transaction 5 data), including optionally transferring funds from a specified account of the customer 18 to a specified account of the merchant 16. In this example, it is envisioned that the merchant 16 would preregister with the transaction interface 15 and be provided with a merchant ID that is associated with the merchant's actual account information 117 (and any other sensitive merchant information) stored in a secure database 110 of the transaction interface 15.

It is also envisioned as an alternative embodiment, that the barcode module 62 can be configured to not generate some or all of the barcodes 200, rather send via request messages the relevant data of the transaction 5 (as collected by the order generation module 60) to the transaction interface 15. In response, the merchant interface 8 would receive via the response messages the generated barcode 200, for subsequent use in providing the barcode 200 to the customer 18. In this case, the barcode module 62 of the transaction interface 15 is the entity that generates the barcodes 200 upon request of the merchant interface 8.

Referring again to FIG. 8, the merchant interface 8 can also optionally have a barcode presentment module 63, used by the merchant 16 to physically and/or electronically display the barcode 200 to the customer 18, for example when ordering and payment of the merchant products are occurring at the point of sale (POS). The POS is defined as a checkout location where the order transaction is initiated and confirmation of transaction acceptance or rejection is received, such that the merchant 16 is the business (bricks and mortar store or service) that takes payment from the customer 18 for the merchant's products. Therefore, it should be recognized that the merchant interface 8 of the POS system can defined to include (or otherwise be associated with—e.g. in communication with via a local area network—not shown) a physical POS terminal (e.g. an electronic cash register) in physical proximity to the customer 18 at the time of product order and purchase. For example, the barcode presentment module 63 can be configured to provide instructions to a printer for physically printing the barcode 200 and/or can be configured to provide instructions to an electronic display for displaying the barcode 200. In either case, the barcode presentment module 63 is configured to present the barcode 200 to the customer 18 for subsequent image capture (of the barcode 200) using the customer's computer device 12 (i.e. mobile device).

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the barcode 200 are unique identifiers representing the particular standard code and custom code (representing invoice specific data) defined in the customized coding scheme 209 that, when read by a barcode decoder, can be used to look up additional information about the invoice item associated with the barcode 200. For example, the price, and optional description, of the product would be encoded in the barcode 200 using the symbology information 204.

Accordingly, the barcode module 62 can take the order invoice 202 data and uses the codes and associated rules of the customized coding interpretation scheme 209 to convert a piece of the unencoded invoice information 201 (for example, a letter, word, phrase, etc.) of the transaction 5 data into another form or representation (one sign into another sign), not necessarily of the same type, i.e. the symbology information 204. In information processing performed by the barcode generation module 62, encoding is the process by which invoice information 201 of the transaction 5 is converted into symbols (of the symbol format 204 defined by the customized coding scheme 209) to be communicated. Decoding is the reverse process, converting these code symbols 204 back into unencoded invoice information 201 understandable by a receiver. Therefore, the symbology information 204 generated from the unencoded invoice information 201 of the transaction 5 data is used by the barcode generation module 62 to construct the barcode 200, according to the customized coding scheme 209. This barcode 200 is made available to the network communications module 50 to be sent in the order response message (for example) to the computer device 12 (e.g. displayed on a browser screen of the user interface 104 of the computer device 12—see FIG. 5, delivered as an image file in the network message, etc.). It is recognized that the barcode 200 represents symbolically the unencoded data 201 of the transaction 5.

Referring again to FIGS. 1 and 3, the transaction 5 is used by the customer 18 and the merchant 16 to define what has been purchased, when, by whom, from whom, and how much money has been spent on what. The barcode 200 is generated to include the symbology information 204 as product invoice information 201 for two or more products (for example) as the transaction 5, such that the symbology information 204 of the barcode 200 encodes information 201 of product data 206, merchant data 208, customer data 211 and/or invoice data 210 of the transaction 5. Therefore, the barcode 200 represents at least part of the transaction 5, using the symbology information 204, defined as a commercial contract issued by the merchant 16 to the customer 18, indicating the products, quantities, and/or agreed prices for products the merchant has (or will) provide the customer 18 in exchange for payment (i.e. debit of customer account and corresponding debit of merchant account) of the transaction 5. Further, the transaction 5 can indicate the customer 18 must pay the merchant 16, according to any payment terms contained in the transaction 5. It is also recognized that the transaction 5 in a rental or professional services context could also include a specific reference to the duration of the time being billed, so rather than quantity, price and cost, the invoicing amount can be based on quantity, price, cost and duration. For example, the rental/services transaction 5 can refer to the actual time (e.g. hours, days, weeks, months, etc.) being billed.

It is recognized that from the point of view of a merchant 16, the transaction 5 can be regarded as a sales invoice. From the point of view of the customer 18, the transaction 5 can be regarded as a purchase invoice. The transaction 5 can identify both the customer 18 and the merchant 16, but the term "invoice" generally refers to the fact that money is owed or owing between the merchant 16 and customer 18.

For example, the product data 206 of the symbology information 204 can include for each product, information such as but not limited to: a product identifier (e.g. product number or code—such as a UPC code), a product purchase price (e.g. unit price of the product), a quantity number of the product (e.g. the number 2 in the case where two of the same product in the purchase order); and/or a description of the product. The merchant data 208 of the symbology information 204 can include information such as but not limited to: name and contact details of the merchant; a bank account number of the merchant; a unique merchant reference ID of the merchant assigned by the processing system 14; location of the merchant retail location; tax or merchant registration details (e.g. tax number or business number such as a VAT (value added tax) identification number or a registration number for GST purposes in order to claim input tax credits) and/or indication of whether the purchase is an online or physical retail location purchase. The transaction data 210 of the symbology information 204 can include information such as but not limited to: a unique reference number (for use in tracking correspondence associated with the transaction 5); date of the transaction; tax payments as a percentage of the purchase price of the each of the products (e.g. GST or VAT); date (e.g. approximate) that the products were (or are to be) sent or delivered; purchase order number (or similar tracking numbers requested by the customer 18 to be mentioned on the transaction 5); total amount charged (optionally with breakdown of taxes) for the product(s); payment terms (including method of payment, date of payment, and/or details about charges for late payment); international customs information; shipping destination; and/or shipping origination location. It is recognized that the data 206,208,210,211 of the symbology information 204 is also represented in at least whole or in part in the unencoded information 201. In this manner, what symbology information 204 in the barcode 200 can be decoded (e.g. by the computer device 12 and/or the transaction interface 15) into the information 201, and the information 201 can be encoded (by the transaction interface 15) into the symbology information 204.

In terms of customer data 211, this data of the symbology information 204 can include information such as but not limited to: a reference code to be passed along the transaction identifying the payer (e.g. customer 18); name and contact details (e.g. address) of the customer 18; and/or an account number (e.g. a bank account number, a credit card number, a debit card number of the customer 18) identifying the source of funds to be used to pay for the products. It is recognized that the account number identifying the customer 18 source of funds to be used to pay for the products, instead of being encoded in the symbology 204, can be supplied by the customer 18 using the user interface 104 of the customer computer device, as further described below.

As discussed above, it is recognized that the customized coding scheme 209 contains codewords and rules for use in translating (i.e. encoding, decoding) between the symbology information 204 of the barcode 200 and the unencoded information 201 of the transaction 5.

Example Transaction Application 113 Configuration

Figure 9:
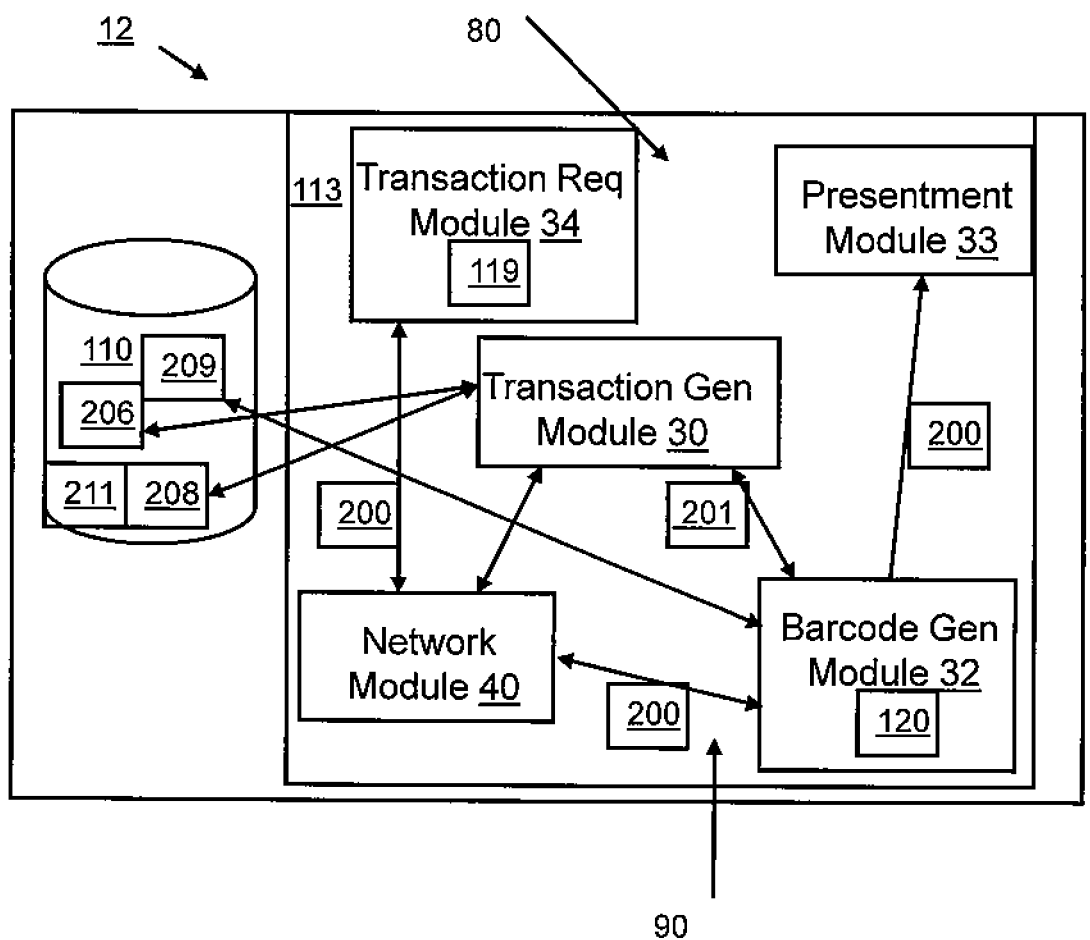
FIG. 9 is a block diagram of a transaction application of FIG. 1.

Referring to FIG. 9, it is recognized that the transaction application 113 can include a plurality of barcode 200 related processing functionality, a plurality of transaction processing functionality and/or client functionality configured for network 11 communication with a transaction interface 15 in a client-server relationship (in association with or in substitution of the systems 80,90 capabilities and functionalities. For example, the transaction application 113 can be configured as a thin client of the transaction interface 15, such that the transaction application 113 is configured to interact with processing systems 80,90 of the transaction interface 15 via a series of web pages generated by the processing systems 80,90 of the transaction interface 15, sent via network messages and displayed on the user interface 104 of the computer 12. Accordingly, the transaction application 113 would interact with a web browser (or other network communication program) to send and receive the messages via the network 11 containing transaction 5 specific information, i.e. to display the web pages on the user interface 104 including output data for the transaction 5 and to coordinate the entry of input data on the user interface 104 and network transmission of the input data for the transaction 5.

Alternatively, the transaction application 113 can be configured as a thick client of the transaction interface 15, such that the transaction application 113 is provisioned with transaction and/or barcode processing functionality similar to (or at least a portion of) that functionality of the barcode processing system 80 and/or barcode generation system 90 of the transaction interface 15, as further described below. It is recognized that the thick client version of the transaction application 113 could be configured to perform some of the transaction or barcode processing on behalf of or otherwise in substitution of any of the processing functionality of the barcode processing system 80 and/or the barcode generation system 90 implemented by the of the transaction interface 15 during processing of the transaction 5. It is also recognized that the thick client version of the transaction application 113 could also be configured to communicate over the network 11 via a series of web pages as generated or otherwise received by the of the transaction interface 15, sent as network messages between the computer devices 6,12 and the transaction interface 15.

Referring to FIGS. 1 and 9, the transaction application 113 can be configured as a client application of the transaction service 20, is configured for generation (i.e. encoding) and presentment of the barcode 200 to the funds responder 18, and/or is configured for processing (i.e. decoding) of the presented barcode 200 and generation of transaction request to the transaction service 20. The transaction application 113 is also configured to provide a graphical interface (on the user interface 104'see FIG. 5), for example, to facilitate entry of information for the merchant 16 as well as entry of the funds amount requested (e.g. via a transaction generation module 30). The transaction application 113 is also configured to provide a graphical interface, for example, to facilitate entry of customer 18 information.

Referring to FIG. 9, shown is an example configuration of the transaction application 113 that can include a network communications module 40 for communicating (e.g. sending or receiving) request messages between the computer devices 6,12 and for communicating (e.g. sending or receiving) messages between the computer devices 6,12 over the communications network 11. The network communications module 40 is also configured for sending a transaction request (e.g. a request containing the appropriate transaction data of the funds amount to allow to the transaction processing system 14 to coordinate the actual funds transfer between accounts 70,72) as well as receiving transaction confirmation messages from the transaction service 20 (containing information indicating that the appropriate account 70,72 has been credited or debited as the case warrants).

The confirmation message(s) received by the transaction application 113 could contain details of the payment processing including that the account was (or will be) credited/debited by the funds amount 203 of the transaction 5, as well as any transaction data 210 (see FIG. 3) identifying the transaction 5 (e.g. transfer ID, customer ID, description of the products, etc.) for their accounting records. It is recognized that the transaction application 113 would could also receive confirmation message(s) containing details of the payment processing including that the account was (or will be) debited by the funds amount 203 of the transaction 5, as well as any transaction data 210 identifying the transaction 5 (e.g. transfer ID, merchant ID, description of the products, etc.) for accounting records.

The network communications module 40 can also be configured to send and receive the transaction confirmation messages over the communications network 11 with respect to the transaction service 20. Also included is a database 110 containing any optional product data 206 (e.g. product descriptions, product availability, etc.), data 208 (e.g. bank account number, a unique reference ID of the merchant assigned by the transaction service 20 (e.g. via the registration module 60—see FIG. 10), tax or merchant business registration details, and registration details 117 of the merchant), customer data 211 (e.g. customer bank account number, a unique customer reference ID of the customer assigned by the transaction service 20 (e.g. via the registration module 60—see FIG. 10), tax or customer business registration details, and registration details 117 of the customer) and network 11 address information of the transaction service 20. It is recognize that preferably the transaction application 113 of the merchant 16 does not have access to sensitive customer data 211 (e.g. PIN numbers and/or actual bank account numbers) and preferably the transaction application 113 of the customer 18 does not have access to sensitive merchant data 208 (e.g. PIN numbers and/or actual bank account numbers).

The database 110 can also have customized barcode definitions of a customized coding scheme 209 containing relationships (e.g. rules) between machine readable symbology and codewords used to encode (or decode) transaction 5 information during generation of the barcode 200 used to represent the transaction 5. For example, the customized coding scheme 209 can be used to encode (i.e. translate) information 201 (see FIG. 3) of the transaction 5 into symbology information 204, performed during generation of the barcode 200 (e.g. by the computer device 12 and/or the transaction service 20). The customized coding scheme 209 can also be used to decode (i.e. interpret) symbology information 204 present in the barcode 200 into text based information 201 of the transaction 5 during processing of the barcode 200 (e.g. by the computer device 12 and/or the transaction service 20). It is recognized that the customized coding scheme 209 can be known to the transaction service 20 and can include customized codewords pertaining to specific funds information such as but not limited to: registration details 117 of the merchant and/or customer, merchant ID, customer ID; funds amounts; transaction number(s); etc.

Referring again to FIG. 9, the transaction application 113 also has a transaction generation module 30 used to collect the transaction 5 data (e.g. product data 206, data 208, data 211 and/or transfer data 210) associated with the transaction 5 selected/entered by the customer 18 during initiation of the transaction 5. It is recognized that optional product data 206 and some of the data 211 of the transaction 5, such as specific products ordered and quantity of each product, could be provided to the transaction generation module 30 obtained from request messages (e.g. via the network communications module 40). Further, the transaction generation module 30 would collect (or otherwise receive) the data 208 for the transaction 5 from the database 110. The transaction generation module 30 also generates the transaction 5 data optionally including total funds amount owed (for example) by the customer 18 and merchant identification information (associated with or otherwise embodying the merchant bank account information) of the transaction 5. For example, in terms of the merchant bank account information, this could be supplied as part of the merchant information included in the transaction 5 data or this could be supplied as a merchant identification information (e.g. merchant ID) used by the transaction service 20 to lookup the actual merchant bank account information known to the transaction service 20 (e.g. via the registration module 60—see FIG. 10) and therefore abstracted from the customer 18.

It is recognized that the transaction generation module 30 could also be configured to provide to the user of the computer device 12 (via a presented graphical user interface on the user interface 104 of the computer device 12) the ability to select or otherwise enter the desired account (e.g. specifying a credit card number, a debit card number, or any other account information for use in accepting/paying the funds amount 203). The transaction generation module 30 could also provide, via the graphical user interface, the ability of the funds requestor 16 to enter their PIN (or other password information specific to accessing their financial accounts directly) associated with the specified account, thereby indicating that the user of the computer device 12 at the time of generating the transaction and resultant barcode 200 has the authority to authorize the transaction service 20 (e.g. via the transfer processing module 65) to coordinate funds transfer involving the specified account. The PIN, or other password information specific to accessing the selected financial accounts directly, can be considered as part of the data 211 included in the funds transaction transfer 5 data and included in the symbology information 204, either directly or otherwise abstracted during generation of the barcode 200. For example, the PIN or other password information would not be the actual PIN or password information made available to the financial institutions of the accounts 70,72, rather would be reference information used by the transaction service 20 (e.g. via the registration module 60) to look up the actual PIN or password information stored in the registration details 117 of the customer 18 using the reference PIN or password provided by the customer 18 during generation of the barcode 200.

This use of PIN or password information is advantageous, in addition to any passwords required to access the computer device 12 in general (e.g. device login) and/or login to the transaction application 113 specifically, as the owner of the computer device 12 would not want any unauthorized access to their financial accounts to occur. It is also envisioned that the entered PIN or password information could be done by the user in order to login to the transaction application 113 itself (i.e. access the functionality of the transaction application 113 provisioned on the computer device 12). It is also recognized that the user of the computer device 12 may wish to have separate PINs or passwords associated with each account accessible through the transaction application 113 itself (e.g. selectable) and/or known to the transaction service 20 (e.g. via the registration module 60) via the registration details 117, in addition to a general login (including password) to the computer device 12 and/or payment application in general.

The transaction application 113 can also have a barcode generation module 32, including an encoder 120, that is configured to use the available/collected transaction 5 data and the customized coding scheme 209 to generate the barcode 200. It is recognized that the barcode 200 is generated by the barcode generation module 32 to contain data of the transaction 5 pertaining to the funds amount, including payment transaction data needed by the transaction service 20 to coordinate settlement of the financial transaction (associated with the transaction 5 data) via the transaction processing system 14 in transferring funds from the specified account of the customer 18 to the specified account of the merchant 16. In this example, it is envisioned that the merchant 16 is preregistered (i.e. has provided the registration details 117) with the transaction service 20 and is provided with a merchant ID (e.g. via the registration module 60) that is associated with the merchant actual account information (and any other sensitive requestor information), both of which are stored in a secure database 110 of the transaction service 20 (thereby providing for the lookup by the registration module 60).

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the barcode 200 are unique identifiers representing the particular standard code and custom code (representing transaction and barcode specific data) defined in the customized coding scheme 209 that, when read by the barcode decoder 119 or encoder 120, can be used to look up additional information about the transaction item associated with the barcode 200. For example, the funds amount, and optional description, of the product would be encoded in the barcode 200 using the symbology information 204.

Accordingly, the barcode generation module 32 takes the transaction 5 data (i.e. as the information 201) and uses the codes and associated rules of the customized coding interpretation scheme 209 to convert a piece of the information 201 (for example, a letter, word, phrase, etc.) of the transaction 5 data into another form or representation (one sign into another sign), not necessarily of the same type, i.e. the symbology information 204. In information processing performed by the barcode generation module 32, encoding is the process by which textual information 201 of the transaction 5 is converted into symbols (of the symbol format 204 defined by the customized coding scheme 209) to be communicated/presented. Decoding is the reverse process, converting these code symbols 204 back into information 201 understandable by a receiver. Therefore, the symbology information 204 generated from the information 201 of the transaction 5 data is used by the barcode generation module 32 to construct the barcode 200, according to the customized coding scheme 209. This barcode 200 can be made available to the network communications module 40 to be sent in the request message (delivered as an image file for example) to the computer device 6 or can be displayed on a browser screen of the user interface 104 of the computer device 12. It is recognized that the barcode 200 represents symbolically the data 201 of the transaction 5.

Referring to FIG. 9, the transaction application 113 also has a transaction request module 34, including the decoder 119, used to decode the received barcode 200, select or otherwise enter (e.g. via a provided graphical user interface generated by the transaction application 113 on the user interface 104 of the computer device 12) account information of the customer 18 as well as any other relevant data 211, and to generate the transaction request directed to the transaction service 20. It is recognized that the transaction request could include decoded transaction 5 data (e.g. funds information 201) obtained from the symbology information 204 of the barcode 200, and/or at least some of the symbology information 204 itself of the barcode 200), as well as account data 211 pertaining to the selected mode of payment/credit and any other input data 215.

It could be advantageous for security purposes to allow the transaction request module 34 to decode only a portion of the symbology information 204 (of the barcode 200) pertinent to the customer 18 (e.g. non-sensitive merchant identification information, unique transfer ID, etc.) and to leave any merchant sensitive information (e.g. merchant account information, for example including PIN or password data) as undecoded (i.e. remain encoded) from the symbology information 204 and therefore abstracted from the customer 18. In this manner, the decoder 119 of the transaction request module 34 would not have the ability to decode certain sensitive information in the symbology information 204 pertaining only to the merchant 16, in other words only that funds data common to both of the merchant 16 and the customer 18 is decodable by the decoder 119 (common information for example could be funds amount, transfer ID, product description, names of merchant and customer).

One embodiment, to provide for the sensitive portions of the symbology information 204 to remain undecoded, is where the decoder 119 (of the transaction application 113) of the computer device 12 does not have access to the encryption key used by the encoder 120 used to generate the merchant specific details of the barcode 200. Further, in this example, it is recognized that in the event where the transaction service 20 does receive encoded symbology information 204 in the transaction request, the transaction service 20 (e.g. via the registration module 60) would have access to the requestor encryption key and/or the responder encryption key via their respective registration details 117 stored in the database 110.

In cryptography, the encryption key can be defined as a piece of information (a parameter) that determines the functional output of a cryptographic algorithm or cipher (i.e. as implemented by the encoder 120 or decoder 119). Without the key, the algorithm of the encoder 120 or decoder 119 would produce no useful result (i.e. the decoded symbology information 204 would be meaningless). In encryption, the key specifies the particular transformation of plaintext into ciphertext, or vice versa during decryption. Keys can be used in cryptographic algorithms, such as digital signature schemes and message authentication codes.

Further, the transaction request module 34 could also be configured to provide to the user of the computer device 12 (via a presented graphical user interface on the user interface 104 of the computer device 12) the ability to select or otherwise enter the desired account (e.g. specifying a credit card number, a debit card number, or any other account information for use in accepting/paying the funds amount). The transaction request module 34 could also provide, via the graphical user interface, the ability of the customer 18 to enter their PIN (or other password information specific to accessing their financial accounts directly) associated with the specified account, thereby indicating that the user of the computer device 12 at the time of generating the transaction request has the authority to authorize the transaction service 20 (e.g. via the transaction processing module 65) to coordinate funds transfer involving the specified account. The PIN, or other password information specific to accessing the selected financial accounts directly, can be considered as part of the data 211 included in transaction request data, either directly or otherwise abstracted during generation of the transaction request. For example, the PIN or other password information would not be the actual PIN or password information made available to the financial institutions of the accounts 70,72, rather would be reference information used by the transaction service 20 (e.g. via the registration module 60) to look up the actual PIN or password information stored in the registration details 117 of the customer 18 using the reference PIN or password information provided by the customer 18 during generation of the transaction request.

Decoding

One example of the customized coding interpretation scheme 209 for barcodes is modified UPC (Universal Product Code). The numbers and/or letters (e.g. ASCII—American Standard Code for Information Interchange) encoded in the barcode 200 are unique identifiers representing the particular custom code defined in the customized coding scheme 209 that, when read by the barcode decoder 119, can be used to look up additional information about the invoice item associated with the barcode 200. For example, the funds amount and optional description of the product would be stored in the barcode 200 using the symbology information 204, as well as any pertinent data 208 and/or data 211. The decoder 119 circuitry and/or software is used to recognize and/or to make sense of the symbology information 204 that make up barcode 200. The decoder 119 can translates symbols 204 into corresponding digital output in a traditional data format (i.e. as information 201). In order to decode the information in barcode 200, for example for 1D barcodes, the widths of the bars and spaces are recognized via edge detection and their widths measured.

Transaction Service 20 and Transaction Interface 15

Figure 10:
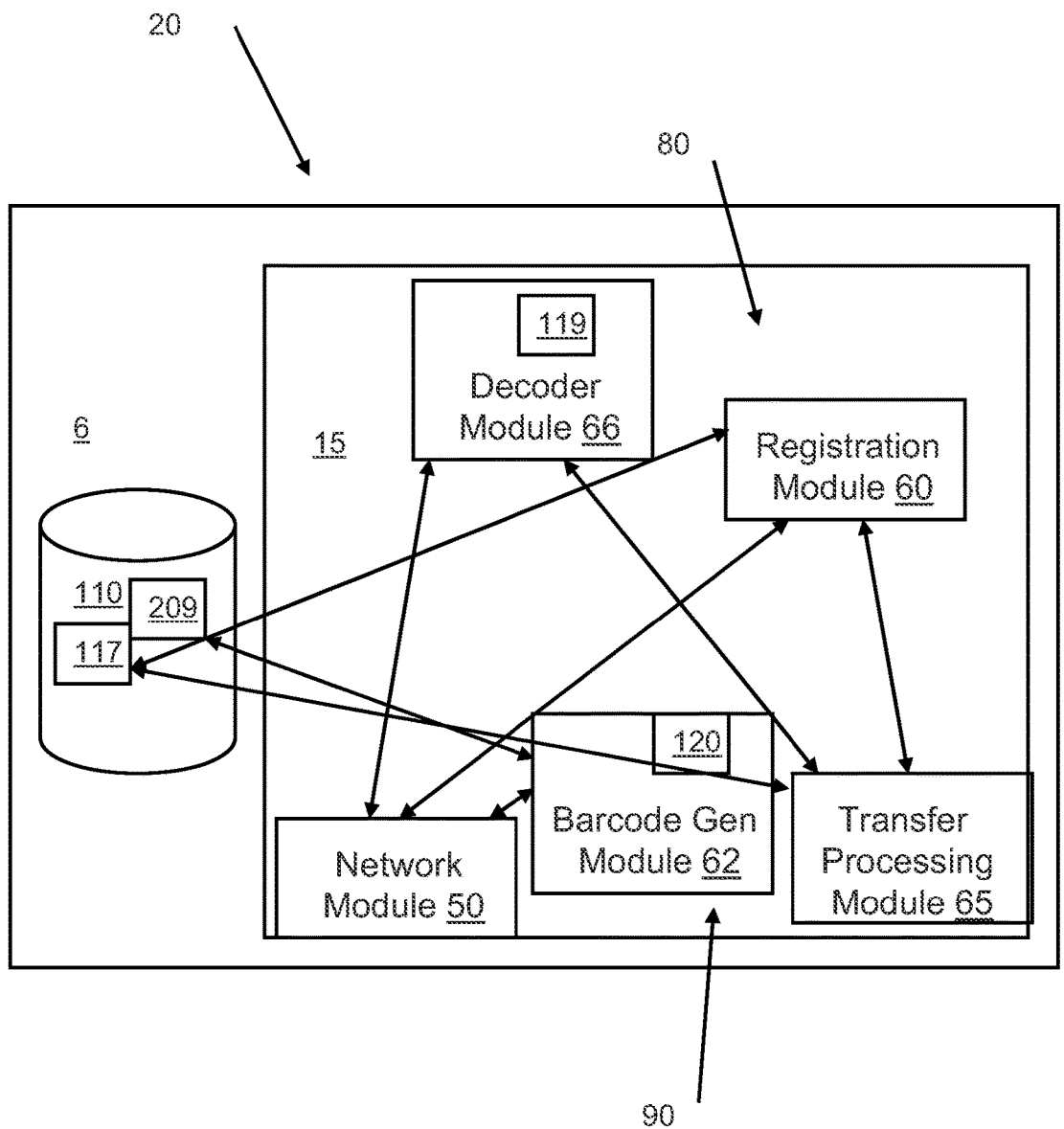
FIG. 10 is a block diagram of a transaction interface of FIG. 1

Referring to FIG. 10, shown is an example configuration of the transaction service 20 including the computer device 6 (e.g. a web server) hosting the transaction interface 15. The transaction interface 15 can include a network communications module 50 for receiving order request messages (e.g. providing information 201 and expecting a generated barcode 200) from the computer device 12 and for sending processing messages to the transaction processing system 14 over the communications network 11.

The network communications module 50 can also be configured to send and receive transfer confirmation messages to the computer devices 17,12 (in response to the received transaction request messages) over the communications network 11 with respect to the computer devices 17,12. Also included is a database 110 containing registration details 117 of the funds merchant 16 and/or customer 16 as discussed above, and network 11 address information of the transaction processing system 14. The database 110 can also have customized barcode definitions of the customized coding scheme 209 containing relationships (e.g. rules) between machine readable symbology and codewords used to encode (or decode) fund information during encoding and/or decoding of symbology information 204 of the barcode 200 used to represent the transaction 5.

For example, the customized coding scheme 209 can be used by the barcode generation module 62 to encode (i.e. translate) text based information 201 of the transaction 5 (including data received from the computer 17) into symbology information 204, performed during generation of the barcode 200. The customized coding scheme 209 can also be used to decode (i.e. interpret) symbology information 204 present in the barcode 200 into text based information 201 of the transaction 5 during processing of the barcode 200. It is recognized that the customized coding scheme 209 is known to the transaction service 20 and can include customized codewords pertaining to specific funds information such as but not limited to: sensitive financial information.

Referring again to FIG. 10, the transaction interface 15 also has a registration module 60 used to collect the registration details 117 during registration of the merchant 16 and/or the customer 18. Further to that discussed above, it is recognized that the registration details 117 can include PIN data and/or password data used to access the specified account(s) 70,72 through the financial institutions of the transaction processing system 14. For example, in terms of the bank account information, this could be supplied as part of the reference account information included in the transaction request, for example used by the registration module 60 to lookup the actual bank account information in the registration details 117 known only to the transaction service 20, and therefore abstracted from the appropriate merchant 16 or customer 18.

The transaction interface 15 can also have the barcode generation module 62 that is configured, by an encoder 120, to use the received information 201 data and the customized coding scheme 209 to generate the barcode 200, for subsequent delivery to the computer device 12 if configured as part of the processing for the transaction 5 (i.e. the computer device 17 sends the information 201 to the transaction service 20 and the transaction service 20 then sends the generated barcode 200 directly to the computer device 12). It is recognized that the barcode 200 can be generated by the barcode generation module 62 to contain data of the transaction 5 pertaining to the funds amount provided by the merchant 16, including transaction data needed by the payment transaction processing system 14 to settle the financial transaction by transferring funds between specified accounts 70,72.

Encoding

One example of the customized coding interpretation scheme 209 for barcodes is a modified UPC (Universal Product Code) to include invoice specific data. Another example is a modified QR scheme, as further described below. The numbers and/or letters (e.g. ASCII—American Standard Code for Information Interchange) stored in the symbology information 204 of the barcode 200 are unique identifiers representing the particular standard code and custom code (representing invoice specific data) defined in the customized coding scheme 209 that, when read by a barcode decoder 119, can be used to look up additional information about the invoice item associated with the barcode 200.

Accordingly, the barcode generation module 62 takes the text based information 201 data and uses the codes and associated rules of the customized coding interpretation scheme 209 to convert a piece of the information 201 (for example, a letter, word, phrase, etc.) into another form or representation (one sign into another sign), not necessarily of the same type, i.e. the symbology information 204. In information processing performed by the barcode generation module 62, encoding is the process by which textual funds information 201 is converted into symbols (of the symbol format 204 defined by the customized coding scheme 209) to be communicated. Decoding is the reverse process, converting these code symbols 204 back into textual information 201 understandable by a receiver. Therefore, the symbology information 204 generated from the textual information 201 is used by the barcode generation module 62 to construct the barcode 200, according to the customized coding scheme 209. This barcode 200 is made available to the network communications module 50 to be sent in the order response message (for example) to the computer device 17 for subsequent delivery to the computer device 12 to be displayed on a browser screen of the user interface 104 of the computer device 12 or otherwise delivered as an image file in the network message. It is recognized that the barcode 200 represents symbolically the data 201. Alternatively, the network communications module 50 could send the barcode 200 in the message directly to the computer device 12 (e.g. displayed on a browser screen of the user interface 104 of the computer device 12 or otherwise delivered as an image file in the network message, etc.).

Referring to FIG. 10, the transaction interface 15 can also have a decoder module 66, including the decoder 119, used to decode the received barcode 200 in the case where the transaction request data includes symbology information 204. For example, the decoder 119 could be used to decode account information of the transaction 5 (pertaining to the selected mode of payment/credit of the requestor and optionally including the PIN or password data of the requestor account) as well as any other relevant requestor data 208 from the symbology 204, for example using the respective encryption key stored in the registration details 117 of the merchant 16).

Referring again to FIG. 10, once all of the textual information 201 is received by the transaction interface 15 or otherwise decoded, a transfer processing module 65 can communicate using transaction processing messages with the transaction processing system 14 (for example to complete the transaction by having funds paid, by completing registration or subscription). It is recognized that the transaction processing messages could include decoded transaction 5 data (e.g. textual information 201) obtained from the symbology information 204 of the barcode 200, and/or as received from the computer device 12, including account data and the funds amount.

Further, the transfer processing module 65 could be configured to confirm whether the received PIN or password information matches the corresponding PIN or password information stored in their respective registration details 117 that is associated with their respective account (e.g. credit card number, a debit card number, or any other account information for use in accepting/paying the funds amount). In the event that the received PIN or password information (for the merchant and/or the customer) matches the corresponding PIN or password information stored in their respective registration details 117, the transfer processing module 65 has confirmed that at the time of generating the barcode 200 and/or at the time that the transaction request was generated, the respective merchant 16 and/or the respective customer 18 had the authority to authorize the transaction service 20 to coordinate funds transfer involving the specified account(s). In the event that the received PIN or password information does not match the corresponding PIN or password information stored in their respective registration details 117, the transfer processing module 65 could deny the transaction request and send notice of the denial back to the computer devices 17,12 via the respective transaction confirmation messages. For example, if both matches fail, then both of the computer devices 17,12 would be notified of the denial. Otherwise if only one of matches failed, then the respective one of the computer devices 17,12 would be notified of the denial.

In any event, the transfer processing module 65 is also configured to receive confirmation message(s) from the transaction processing system 14, such that confirmation message(s) include a confirmation that the funds amount has either been transferred between accounts 70,72 or declined. The confirmation message(s) sent by the transaction service 20 can include instructions to the respective financial institutions (not shown), for example, associated with the customer and merchant account information to debit the appropriate account 70,72 and credit the appropriate account 70,72 by the funds amount 203 along with the required account data and (optional) PIN or password data. The confirmation message(s) received by the transaction interface 15 from the transaction payment processing system 14 could contain details of the payment processing including that the accounts were (or will be) credited by the amount, as well as any transfer data 210 (e.g. transfer ID) for accounting records.

In is recognized in the above embodiments, that in terms of the account information, this could be supplied as specifically the account number or this could be supplied as identification information (e.g. account ID) used by the transaction service 20 to lookup the actual bank account information known to the transaction service 20 (via the respective registration details 117) and therefore the account number would be abstracted from the general communications over the network 11.

I claim:

1. A computer-implemented system for coordinating and expediting processing of an electronic transaction between respective computing devices of a consumer and a merchant, the electronic transaction associated with the merchant providing a product to the consumer, the system comprising:

a computer processor coupled to a memory, wherein the computer processor is programmed by a set of instructions stored in the memory to coordinate processing of the electronic transaction by:

receiving by the computer processor transaction information about the transaction from a consumer device of the consumer over a communications network, the transaction information obtained from a barcode and including merchant identification information of the merchant, product information and a transaction identifier;

accessing by the computer processor a database of merchant profile data using the merchant identification information obtained from the barcode to access a merchant profile of the merchant to determine a transaction type of the transaction from a plurality of different transaction types relevant for the merchant providing the product, each transaction type using customized workflow instructions to deliver output data appropriate to the transaction type to the consumer device for directing a user of the consumer device to provide input data used for completion of the transaction for the determined transaction type of the merchant profile, and thereby said identification and determination of the transaction type for automatically configuring the system for subsequent interaction and communication with the consumer device over the communications network according to the determined transaction type by selecting the customized workflow instructions from details associated with the determined transaction type;

executing by the computer processor the customized workflow instructions of the transaction type to deliver the output data via the communications network to the consumer device, the output data including screen data appropriate to the transaction type of the plurality of transaction types for display to a user of the consumer device for directing the user to provide the input data via a user interface of the consumer device;

receiving by the computer processor the input data via the communications network from the consumer device and storing the input data generating a transaction request including at least a portion of the input data and at least a portion of the transaction information; and sending by the computer processor the transaction request via the communications network to a transaction processing for facilitating completion of the electronic transaction between the merchant and the consumer.

2. The system of claim 1, wherein the computer processor is further programmed to coordinate processing of the transaction by:

encoding the barcode to include the merchant identification information and the transaction identifier encoded in symbology information using a coding scheme of the barcode; and sending the barcode to the merchant interface for use in initiating the transaction with the consumer, wherein the barcode is subsequently made available to the consumer device via the merchant.

3. The system of claim 2, wherein the barcode is received by a transaction application of the consumer device as a barcode image captured by an imager operated by the consumer device.

4. The system of claim 1, wherein the step of receiving the transaction information further comprises receiving consumer identification information, and the computer processor is further programmed to coordinate processing of the transaction by:

accessing the database of consumer profile data using the consumer identification information to access a consumer profile of the consumer and to collect consumer data to store as further input data to include in the transaction request.

5. The system of claim 1, wherein the transaction request includes product information of the merchant including a financial amount.

6. The system of claim 1, wherein the input data includes consumer financial account information for use in paying settling the financial amount via the transaction processing system, the financial account information selected from a plurality of available consumer financial accounts.

7. The system of claim 1, wherein the computer processor is further programmed to coordinate processing of the transaction by:

sending account information to the transaction processing system including the consumer financial account information and merchant financial account information;

receiving settlement information of the financial amount; and sending the settlement information to at least one of the consumer device or the merchant interface.

8. The system of claim 1, wherein the output data is one or more pages configured for display by a browser of the consumer device and the input data includes one or more entries of the consumer.

9. The system of claim 1, wherein at least a portion of the received transaction information is encoded in symbology information.

10. The system of claim 9, wherein the computer processor is further programmed to coordinate processing of the transaction by:

decoding the symbology information to obtain at least a portion of the transaction information.

11. A computer-implemented method for coordinating and expediting processing of an electronic transaction between respective computing devices of a consumer and a merchant, the electronic transaction associated with the merchant providing a product to the consumer, the method comprising a set of instructions stored in memory to coordinate processing of the electronic transaction by execution of a computer processor for:

receiving, via a communications network, by the computer processor transaction information about the transaction from a consumer device of the consumer over a communications network, the transaction information obtained from a barcode and including merchant identification information of the merchant, product information and a transaction identifier;

accessing by the computer processor a database of merchant profile data using the merchant identification information obtained from the barcode to access a merchant profile of the merchant to determine a transaction type of the transaction from a plurality of different transaction types relevant for the merchant providing the product, each transaction type using customized workflow instructions to deliver output data appropriate to the transaction type to the consumer device for directing a user of the consumer device to provide input data used for completion of the transaction for the determined transaction type of the merchant profile, and thereby said identification and determination of the transaction type for automatically configuring the subsequent interaction and communication with the consumer device over the communications network according to the determined transaction type by selecting the customized workflow instructions from details associated with the determined transaction type;

executing by the computer processor the customized workflow instructions of the transaction type to deliver the output data via the communications network to the consumer device, the output data including screen data appropriate to the transaction type of the plurality of transaction types for display to a user of the consumer device for directing the user to provide the input data via a user interface of the consumer device;

receiving by the computer processor the input data via the communications network from the consumer device and storing the input data generating a transaction request including at least a portion of the input data and at least a portion of the transaction information; and sending by the computer processor the transaction request via the communications network to a transaction processing system for facilitating completion of the electronic transaction between the merchant and the consumer.

12. The method of claim 11 further comprising:
encoding the barcode to include the merchant identification information and the transaction identifier encoded in symbology information using a coding scheme of the barcode; and
sending the barcode to the merchant interface for use in initiating the transaction with a consumer, wherein the barcode is subsequently made available to the consumer device via the merchant.

13. The method of claim 11, wherein the step of receiving the transaction information further comprises receiving consumer identification information, and the method further comprises:
accessing the database of consumer profile data using the consumer identification information of the consumer to access a consumer profile of the consumer and to collect consumer data as further input data to include in the transaction request.

14. The method of claim 11 further comprising:
sending account information to transaction processing system including the consumer financial account information and merchant financial account information;
receiving settlement information of the financial amount; and
sending the settlement information to at least one of the consumer device or the merchant interface.

15. The method of claim 14, wherein the output data is one or more pages configured for display by a browser of the consumer device and the input data includes one or more entries of the consumer.

16. The method of claim 11 further comprising:
decoding symbology information included in the received transaction information to obtain at least a portion of the transaction information.

* * * * *